United States Patent
Wakazono et al.

[11] Patent Number: 6,161,995
[45] Date of Patent: Dec. 19, 2000

[54] MACHINE TOOL

[75] Inventors: Yoshio Wakazono, Nagoya; Kazuo Machida, Kariya; Wataru Iida, Aichi-ken; Katsuhiko Takeuchi, Anjo, all of Japan

[73] Assignee: Toyoda Koki Kabushiki Kaisha, Kariya, Japan

[21] Appl. No.: 09/122,112

[22] Filed: Jul. 24, 1998

[30] Foreign Application Priority Data

Jul. 24, 1997 [JP] Japan ................................. 9-198712
Feb. 4, 1998 [JP] Japan ............................... 10-023523

[51] Int. Cl.[7] ....................................................... B23C 1/02
[52] U.S. Cl. ........................... 409/191; 408/234; 409/202; 409/235
[58] Field of Search .................................. 409/185, 190, 409/191, 202, 235; 408/234

[56] References Cited

U.S. PATENT DOCUMENTS

| | | | |
|---|---|---|---|
| 4,229,886 | 10/1980 | Berthier | 409/235 |
| 5,161,926 | 11/1992 | Schulz | 409/235 |
| 5,241,888 | 9/1993 | Chen. | |
| 5,314,397 | 5/1994 | Mills et al. | 408/234 |
| 5,346,345 | 9/1994 | Jerzycke et al. | 409/191 |
| 5,368,425 | 11/1994 | Mills et al. | 409/191 |
| 5,401,128 | 3/1995 | Lindem et al. | 409/235 |
| 5,662,568 | 9/1997 | Lindem | 408/234 |
| 5,688,084 | 11/1997 | Fritz et al. | 409/235 |
| 5,933,933 | 8/1999 | Fritz et al. | 409/202 |

FOREIGN PATENT DOCUMENTS 0 614 724  9/1994  European Pat. Off. .
0 742 072  11/1996  European Pat. Off. .

Primary Examiner—Daniel W. Howell
Attorney, Agent, or Firm—Oblon, Spivak, McClelland, Maier & Neustadt, P.C.

[57] ABSTRACT

A machine tool is structured enhance rigidity of a slide member opposing to a cutting force acting on a tool spindle with no extra increase in weight, thereby intending to lighten the slide member. The machine tool comprises a tool spindle rotating around an axis extending along an Z-axis, a slide member slidable in at least one of the X-axis, Y-axis and Z-axis directions and a guide apparatus having a straight rail and movably supporting the slide member on the guide rail and disposed such that three supporting points for supporting the slide member form vertexes of a triangle as seen from the X-axis direction. Further, in another construction, two sets of linear guide mechanism and a linear motor for guiding each of an upper portion and a lower portion of a gantry are respectively disposed between a lower surface of the gantry and a base, and between a front surface of a cross beam and an upper back surface of the gantry, so that the cross beam does not lap over the upper surface of the gantry.

18 Claims, 20 Drawing Sheets

FIG. 10 (a) FIG. 10 (b) FIG. 10 (c)
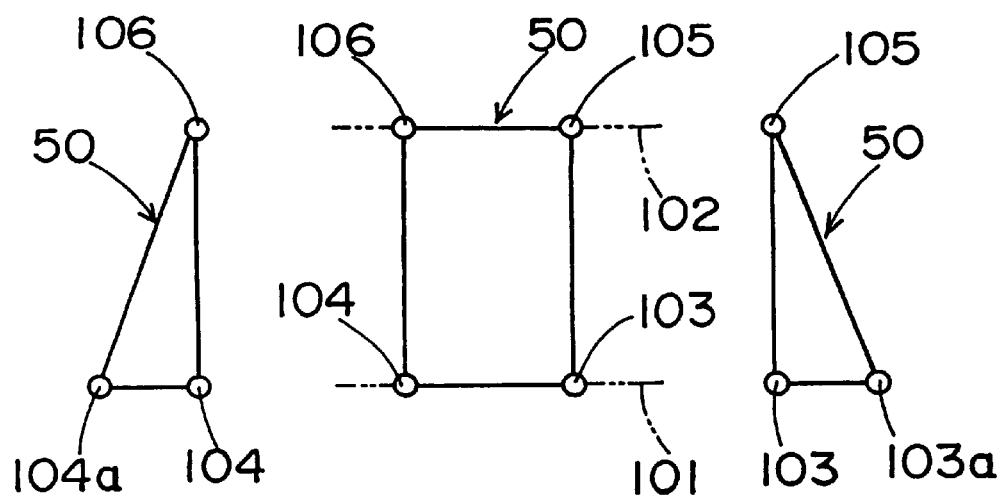
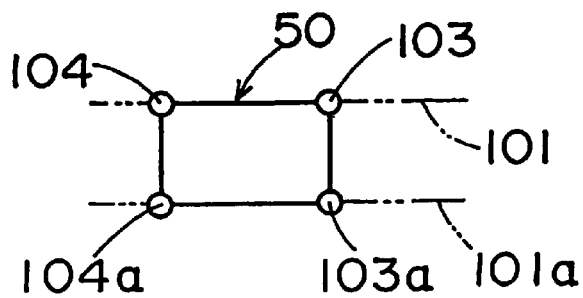
FIG. 10 (d)

FIG. 12 (a)  FIG. 12 (b)  FIG. 12 (c)
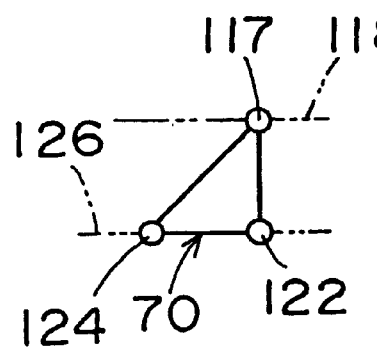
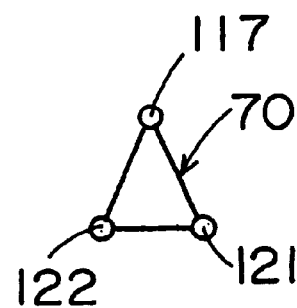
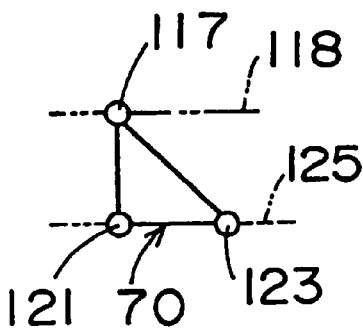
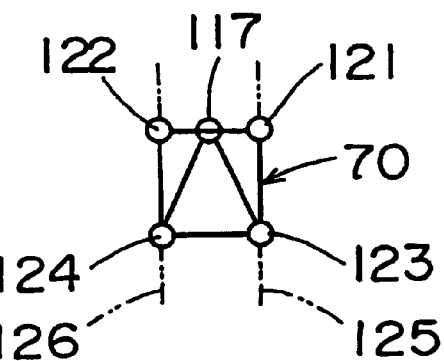
FIG. 12 (d)

MACHINE TOOL

BACKGROUND OF THE INVENTION

1. Field of the Invention

The present invention relates to a machine tool for machining a workpiece by moving a tool spindle in three directions mutually perpendicular to each other with respect to the workpiece, and more particularly, to a machine tool in the form of that a feed movement of a tool spindle in at least one direction is driven by a linear motor.

2. Description of the Related Arts

In this kind of machine tool disclosed in Japanese Patent Application Laid-Open (JP-A) No. 8-318445, a box frame 481 is arranged on a base 480 to guide a gantry 483 at upper and lower end portions thereof within a rectangular window 482 opened in the box frame 481, as shown in FIGS. 1 and 2. The gantry 483 is fed in an X-axis direction by a pair of linear motors 484 and 485 each disposed between the upper and lower end portions of the gantry 483 and opposite surfaces of the frame 481 thereto.

Further, the gantry 483 has a rectangular window 486 in which a saddle 487 is guided within the rectangular window 486 by a pair of right and left linear guide mechanisms (not shown) to be movable and fed in a Y-axis direction by a pair of right and left linear motors 488. A ram 490 is guided on the saddle 487 by a linear guide mechanism (not shown) to be movable forward and rearward in a Z-axis direction by a liner motor (not shown) The ram 490 also rotatably supports a tool spindle 490a rotated by a drive motor (not shown) around the Z-axis.

Each of the linear guide mechanisms for guiding the gantry 483 at left and right sides in the X-axis direction consists of a lower linear guide mechanism 491 including a guide rail and a bearing block running thereon, and an upper linear guide mechanism 492. The lower linear guide mechanism 491 is disposed between a lower surface of the gantry 483 and a lower beam member 481c of the box frame 481, and the upper linear guide mechanism 492 is disposed between a front surface of a cross beam 481a of the frame 481 and a back surface of an upper portion of the gantry 483 opposite thereto.

In the conventional machine tool driven by the linear motor mentioned above, since the gantry 483 is arranged so as to be movable within the rectangular window 482 opened in the frame 481, a stroke of the gantry 483 in the Y-axis direction is limited between right and left column members 481b of the frame 481.

Further, the cross beam 481a of the frame 481 is arranged to cover an upper end surface of the gantry 483, so that a height of the frame 481 increases, thereby being enlarged in the volume of the machine tool.

Furthermore, since the lower linear guide mechanism 491 for guiding the lower end portion of the gantry 483 in the X-axis direction is mounted to a lower surface of a base plate 483a of the gantry 483, in the case of inspection, maintenance and replacement of the linear guide mechanism and the linear motor 488 for moving in the Y-axis direction the saddle 487 mounted on the right and left end surfaces of the rectangular window 486 in the gantry 483, it is required to separately remove all the elements provided on the base plate 483c of the gantry 483. Therefore, this may causes a troublesome in reassemble work of the linear guide mechanism and the linear motor the after the inspection, maintenance and replacement operation thereof.

Next, a machine tool disclosed in Japanese Patent Application Laid-Open(JP-A) No. 8-318445 will be explained in further detail with reference to schematic drawings of FIGS. 3 and 4 with respect to the prior art.

In FIG. 3, the gantry 483 is provided in a frame (not shown) through the pair of upper and lower linear guide mechanisms 491 and 492 for being slidably driven along the X-axis. The linear guide mechanisms 491 and 492 for the X-axis drive are arranged in parallel in the Y-axis direction in which the tool spindle 490a is rotatably supported around the Z-axis therebetween. The lower linear guide mechanism 491 is composed of a straight rail 101 extending along the X-axis and right and left bearing blocks 103 and 104 slidably engaged therewith. The straight rail 101 is fixed to the frame, and the bearing blocks 103 and 104 are fixed to the gantry 483.

Similarly to the lower linear guide mechanism 491, the upper linear guide mechanism 492 is composed of a straight rail 102 fixed to the frame and right and left bearing blocks 105 and 106 which are slidably engaged therewith and fixed to the gantry 483. X-axis guide means for slidably guiding the gantry 483 along the X-axis consists of the pair of upper and lower X-axis linear guide mechanisms 491 and 492 as described above. Further, in the X-axis guide means, four bearing blocks 103, 104, 105 and 106 fixed to the gantry 483 are arranged on the same plane perpendicular to the Z-axis.

Further, the saddle 487 is provided on the gantry 483 through Y-axis linear guide mechanisms 422 and 424 so as to be slidable along the Y-axis. The Y-axis linear guide mechanisms 422 and 424 are disposed in parallel to the X-axis direction in which the tool spindle 490a is rotatably supported therebetween. The right Y-axis linear guide mechanism 424 is composed of a straight rail 110 extending along the Y-axis and lower and upper bearing blocks 112 and 114 slidably engaged therewith. The straight rail 110 is fixed to the gantry 483, and the bearing blocks 112 and 114 are fixed to the saddle 487.

Similarly to the right Y-axis linear guide mechanism 424, the left Y-axis linear guide mechanism 422 is composed of a straight rail 111 fixed to the gantry 483 and lower and upper bearing blocks 113 and 115 which are slidably engaged with the straight rail 111 and fixed to the saddle 487. The Y-axis guide means for slidably guiding the saddle 487 in the Y-axis direction consists of the pairs of right and left Y-axis linear guide mechanisms 422 and 424 mentioned above. Further, in the Y-axis guide means, four bearing blocks 112, 113, 114 and 115 fixed to the saddle 487 are disposed on the same plane perpendicular to the Z-axis.

Further, in FIG. 4, the ram 490 is provided in the saddle 487 through Y-axis linear guide mechanisms 432 and 434 slidable along the Z-axis. Z-axis linear guide mechanisms 432 and 434 are disposed in parallel in the X-axis direction downward of the tool spindle 490a. The right Z-axis linear guide mechanism 434 is composed of a straight rail 125 extending along the Z-axis and back-and-forth bearing blocks 121 and 123 slidably engaged therewith. The straight rail 125 is fixed to the ram 490, and the bearing blocks 121 and 123 are fixed to the saddle 487.

Similarly to the right Z-axis guide mechanism 434, the left X-axis linear guide mechanism 432 is composed of a straight rail 126 fixed to the ram 490 and back-and-forth bearing blocks 122 and 124 which are slidably engaged therewith and fixed to the saddle 487. Z-axis guide means for slidably guiding the ram 490 along the Z-axis consists of the pair of left and right Z-axis linear guide mechanisms 432 and 434, as described above. Further in the Z-axis guide means, four bearing blocks 121, 122, 123 and 124 fixed to the ram 490 are disposed on the same plane perpendicular to the Y-axis.

In this machine tool, the four bearing blocks 103, 104, 105 and 106 of the X-axis guide means disposed on the same plane perpendicular to the Z-axis to support the gantry 483 are fixed to a front surface thereof. Similarly, the four bearing blocks 112, 113, 114 and 115 of the Y-axis guide means for supporting the saddle 487 are fixed to a front surface thereof. In such a construction, cutting forces acting on the tool spindle 490a are concentrically applied in a cutting operation of the workpiece to each of the front surfaces of the gantry 483 fixing the bearing blocks 103, 104, 105 and 106 and of the saddle 487 fixing the bearing blocks 112, 113, 114 and 115, respectively.

Each of the front surfaces of the gantry 483 and the saddle 487, thus, is required to be high in rigidity to react with the cutting force acting on the tool spindle 490a. In the conventional machine tool, the rigidity of the front surfaces is enhanced by increasing a thickness of each front surfaces of the gantry 483 and the saddle 487. However, since the thickness increase of the front surfaces in the gantry 483 and the saddle 487 does not effectively act on the other portion thereof with respect to the cutting force, the resultant weight is excessively increased, thereby preventing the weight reduction of the gantry 483 and the saddle 487.

Further, the ram 490 is supported by the four bearing blocks 121, 122, 123 and 124 of the Z-axis guide means disposed on the same plane perpendicular to the Y-axis, this causes a similar problem to that in the gantry 483 and the saddle 487. Generally, it is contrary problems to each other to require to reduce the weight of the slide members in the gantry 483, the saddle 487 and the ram 490 and to enhance the rigidity thereof. However, it is particularly important to simultaneously satisfy the problems as mentioned above, in the machine tool driven by the linear motor in which the slide member is positioned by the linear motor at a high speed.

SUMMARY OF THE INVENTION

An object of the present invention is to provide a machine tool which improves rigidity of a slide member to bear a cutting force acting on a tool spindle without increasing its weight excessively, by which the weight of the slide member can be reduced.

Another object of the present invention is to expand a lateral stroke of a gantry without being influenced by limitation of the lateral stroke of the gantry owing to an interference between the gantry and a column member of a fixing frame.

Further, the other object of the present invention is to decrease a height of a cross beam for connecting upper end of the column member of the fixing frame, thereby making the machine tool compact and improving its rigidity.

Still further, the other object of the present invention is to keep a state in which a vertical beam member is held by a guide rail of a linear guide mechanism for guiding a lower end portion of the gantry even in the case of separating a pair of right and left vertical beam members constituting the gantry, thereby facilitating effective reassembling work after decomposition.

A machine tool in accordance with the present invention is structured, when it is assumed that a horizontal direction of a frame is an X-axis direction, a vertical direction thereof is a Y-axis direction and a longitudinal direction thereof is a Z-axis direction, to include a tool spindle rotating around an axis extending along the Z-axis, a slide member slidable at least in one of the X-axis, Y-axis and Z-axis directions, and a guide apparatus having a straight rail, movably supporting the slide member on the guide rail, and disposed such that three supporting points for supporting the slide member form vertexes of a triangle as seen from the X-axis direction.

In this structure, since the three supporting points are disposed to form the vertexes of a triangle as seen from the X-axis direction, it can rationally bear a cutting force acting on the tool spindle. Necessity of enhancing rigidity by increasing a thickness of the slide member accompanied with the increase in its weight, thus, can be eliminated. As a result, the slide member can be lightened, which may realize high speed feeding thereof, resulting in shortened working time of the machine tool.

In the case where the slide member is constituted by a gantry capable of moving along the X-axis, a saddle capable of moving along the Y-axis and a ram capable of moving along the Z-axis, each weight of the gantry, the saddle and the ram can be reduced.

Further, in the case where two supporting points among three supporting points of the X-axis guide apparatus and two supporting points among three supporting points of the Y-axis guide apparatus are disposed on the same plane perpendicular to the Z-axis, the gantry and the saddle can be arranged in a compact manner with respect to the Z-axis.

Still further, in the case where three supporting points of the Z-axis guide apparatus is disposed to form vertexes of an isosceles triangle having a horizontal bottom line as seen from the Z-axis direction, it can be effectively supported in the front side of the ram by the decreased number of supporting points, thereby preventing downward hanging due to gravity during forward movement of the ram. In addition, a high rigidity that can bear the cutting force acting on the tool spindle can be obtained.

Furthermore, a machine tool in accordance with the present invention is structured to include a tool spindle rotating around an axis, a slide member movable in the axial direction of the tool spindle, a drive apparatus for moving the slide member, and a guide apparatus having a straight rail, movably supporting the slide member on the guide rail, and disposed such that supporting points for supporting the slide member form vertexes of a triangle as seen from a direction perpendicular to the axial direction of the tool spindle.

In this structure, the supporting points for supporting the slide member are disposed to form the vertexes of a triangle as seen from the direction perpendicular to the axial direction of the tool spindle. This structure, thus prevents downward hanging due to gravity during forward movement of the slide member.

This structure is particularly effective when the supporting points are set to form vertexes of a right triangle while the slide member being at a forward moving end.

Further, a machine tool of the present invention is structured such that a gantry is disposed forward of a fixing frame on a base so as to be capable of moving on the base in a first horizontal direction, by which a part of the gantry can move in the first horizontal direction while being received in the fixing frame. As means for guiding and driving the gantry in the first horizontal direction, the lower guide means and the lower linear motor are disposed between the lower surface of the gantry and the base. Meanwhile the upper guide means and the upper linear motor are disposed between the upper back surface of the gantry and the upper front surface of the fixing frame, thereby preventing the fixing frame from covering over the upper end portion of the gantry. Preferably, it is structured such that the upper end portion of the gantry faces the upper end portion of the fixing frame in the horizontal direction, and the fixing frame does not exceed the height of the gantry.

In accordance with this structure, since the gantry is disposed so as to be capable of moving forward of the fixing frame in the first horizontal direction, the gantry can be moved with a lapping relation to the fixing frame, and the moving stroke end of the gantry is not limited by the member constituting the fixing frame. As a result an opening portion of the machine tool can be decreased by securing a desired moving stroke of the gantry. Further, since the upper and lower guide means for moving gantry in the first horizontal direction and the upper and lower linear motors for driving the gantry along the guide means are disposed between the lower surface of the gantry and the upper surface of the base, and between the upper back surface of the gantry and the upper front surface of the fixing frame, the height of the fixing frame can be low while satisfying the requirement of guiding and driving the gantry in the upper and lower portions, so that the machine tool can be made compact as well as decreasing the above-described opening portion.

Preferably, by extending both ends of the rail means constituting the upper and lower guide means of the gantry over the first opening portion of the fixing frame, the rigidity at a time when the gantry is positioned at the moving end can be secured.

Further, in the case of disposing the upper and lower linear motors such that a point of application of these suction forces are positioned within the same vertical surface as center of gravity of the gantry, preferably a center of gravity of the assembly upwardly and downwardly moving together with the gantry, the gantry 20 can be smoothly moved.

Still further, as a preferable construction, in the case of disposing in such a manner that each of the upper and lower linear motors generates a suction force in a different direction, and a combination force of these forces urges the gantry to the fixing frame in a rearward and obliquely downward direction, the relative position of the gantry in the vertical direction and the longitudinal direction can be maintained in an immovable state with respect to the base and the fixing frame.

Furthermore, in the case of projecting the cross beam of the fixing frame to a middle position of the gantry in the second horizontal direction perpendicular to the first horizontal direction and disposing the upper guide means in a front surface of the projecting portion, the gantry can be guided above the center of gravity of the gantry, and the gantry can be smoothly moved in the first horizontal direction.

Moreover, in the case of disposing the lower linear motor immediately under the upper guide rail means in the second horizontal direction and disposing the lower linear motor between a pair of guide rails, the lower portion of the gantry can be driven in the first horizontal direction immediately below the center of gravity of the gantry, so that the gantry can be further smoothly moved in the first horizontal direction with cooperating with the upper guide means.

Further, as the other preferable structure, the structure is made such that a slant surface inclined to the second horizontal direction of the base is formed, right and left column members of the fixing frame is stood on the slant surface, and the cross beam connecting the upper ends of the column member to each other forward projects toward the gantry. In this case, the upper end of the gantry can be disposed in the upper guide means guiding and driving in the first horizontal direction, and the upper linear motor can be disposed immediately above the center of gravity of the gantry in the second horizontal direction, so that the upper end of the gantry can be smoothly guided and driven in the first horizontal direction.

Still further, as the other preferable structure, the gantry is constituted by the right and left vertical beam members and the upper and lower horizontal beam members connecting the upper portions of the vertical beam members to each other and the lower portions thereof to each other in a manner of capable of separating, and two bearing blocks running on the guide rail of the lower guide means are respectively mounted on the lower surface of the vertical beam member. In this case, even in the case of separating the gantry into four members comprising the right and left vertical beam members and the upper and lower horizontal beam members, the right and left vertical beam members can be held in a standing state through the bearing block mounted on the lower surface in such a manner as to be capable of individually moving on the guide rail of the lower guide means, so that the guide means and the drive means of the saddle provided in the inner surface of each of the vertical beam members by expanding an interval of the right and left vertical beam members can be easily inspected, maintained and replaced.

Further, the cross beam of the fixing frame can be separated from the right and left column members, a pair of guide rails are provided as the lower guide means of the gantry, the lower horizontal beam member of the gantry is guided to the guide rail separately provided from the guide rail guiding the vertical beam member of the gantry. In this case, even in the case that the right and left vertical beam members and the upper and lower horizontal beam members constituting the gantry are separated into four members for inspection or maintenance, all of the four members can be held in a state of being guided to the guide rail. Accordingly, since the guide state of each of the four members and the guide rail guiding, this is held in a state before separation in the separating state, a reassembling after inspection or maintenance can be simplified.

BRIEF DESCRIPTION OF THE DRAWINGS

FIG. 10 is an explanatory view showing an arrangement of a bearing block in X-axis guide means according to the first embodiment;

FIG. 11 is an explanatory view showing an arrangement of a bearing block in Y-axis guide means according to the first embodiment;

FIG. 12 is an explanatory view showing an arrangement of a bearing block in Z-axis guide means according to the first embodiment;

Figure 1:
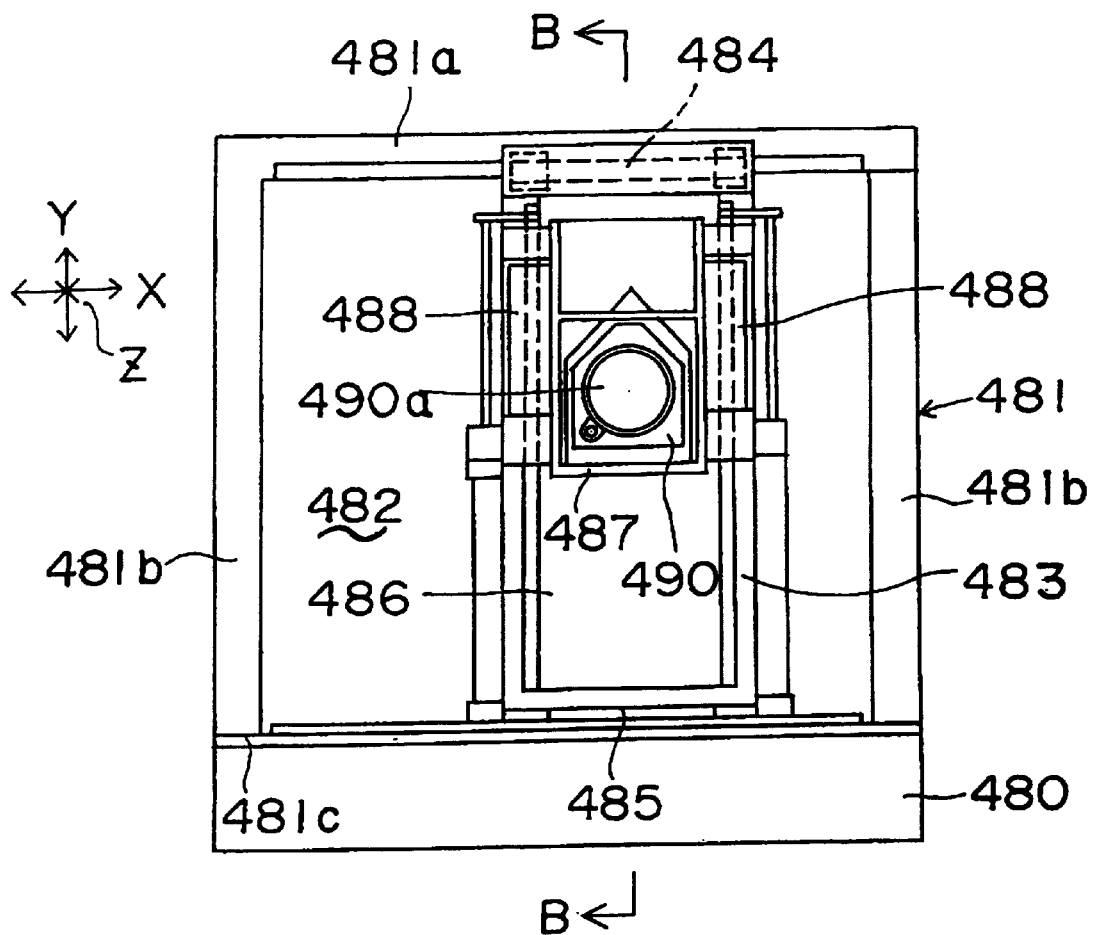
FIG. 1 is a front view of a conventional machine tool driven by a linear motor.
Figure 2:
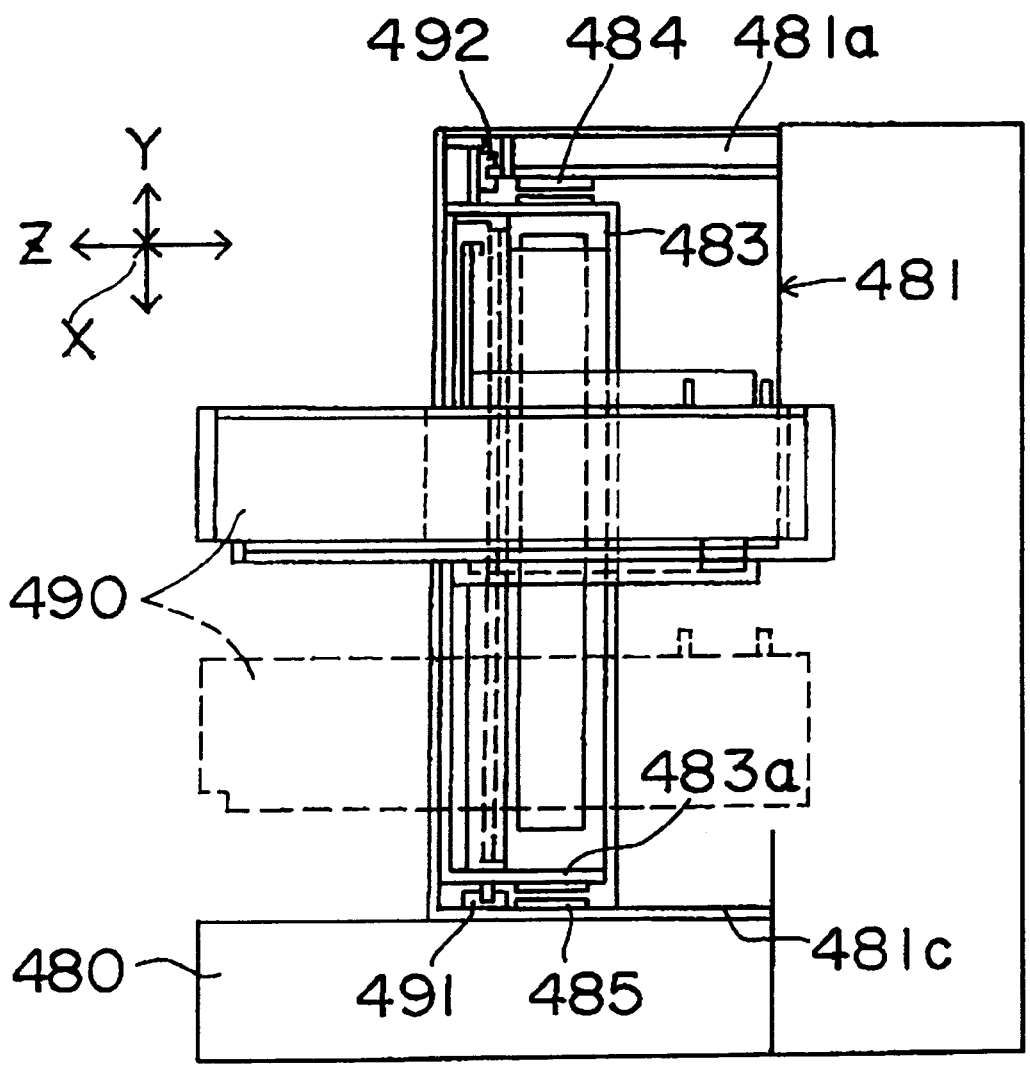
FIG. 2 is a cross sectional view along a line B—B of the conventional machine tool driven by the linear motor shown in FIG. 1.
Figure 3:
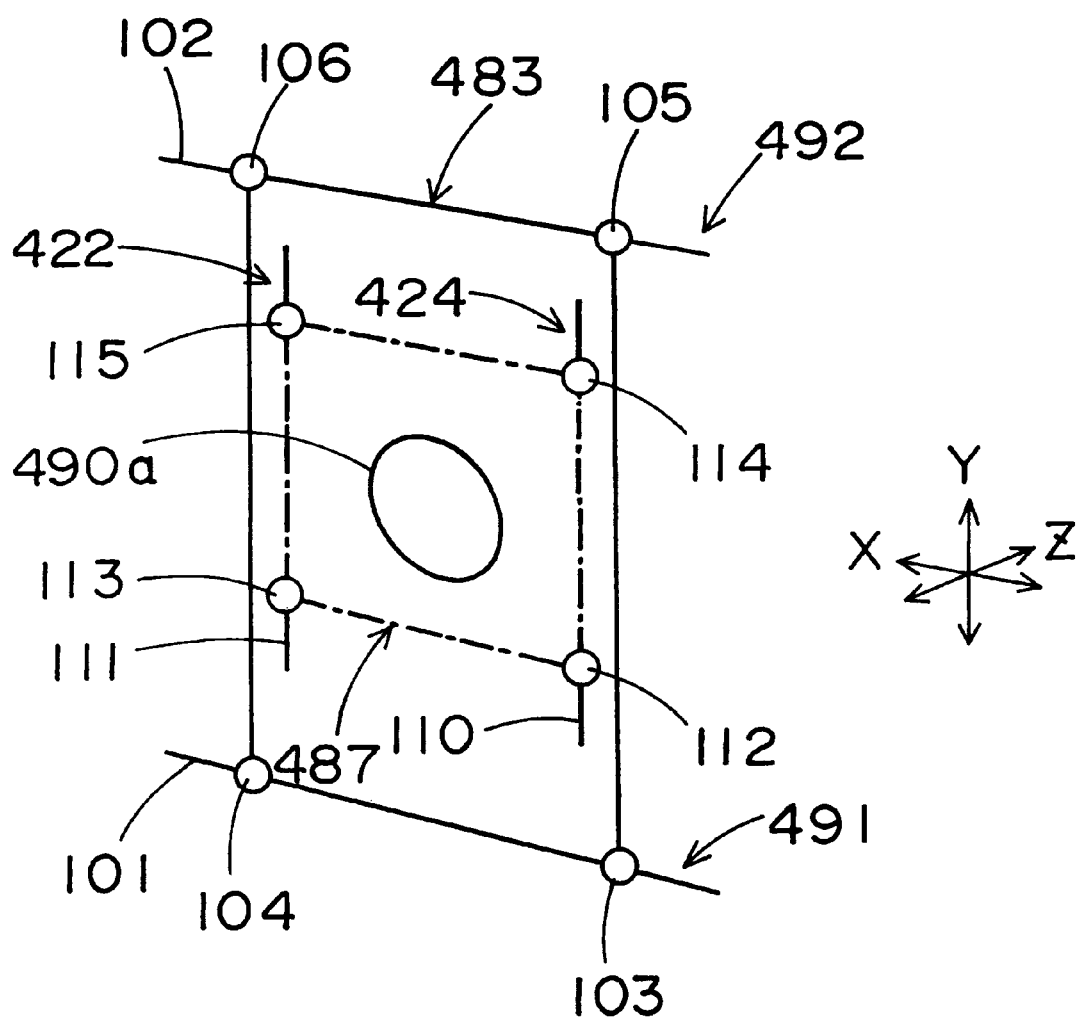
FIG. 3 is a schematic view showing a relationship between a gantry and a saddle in another conventional machine tool driven by a linear motor.
Figure 4:
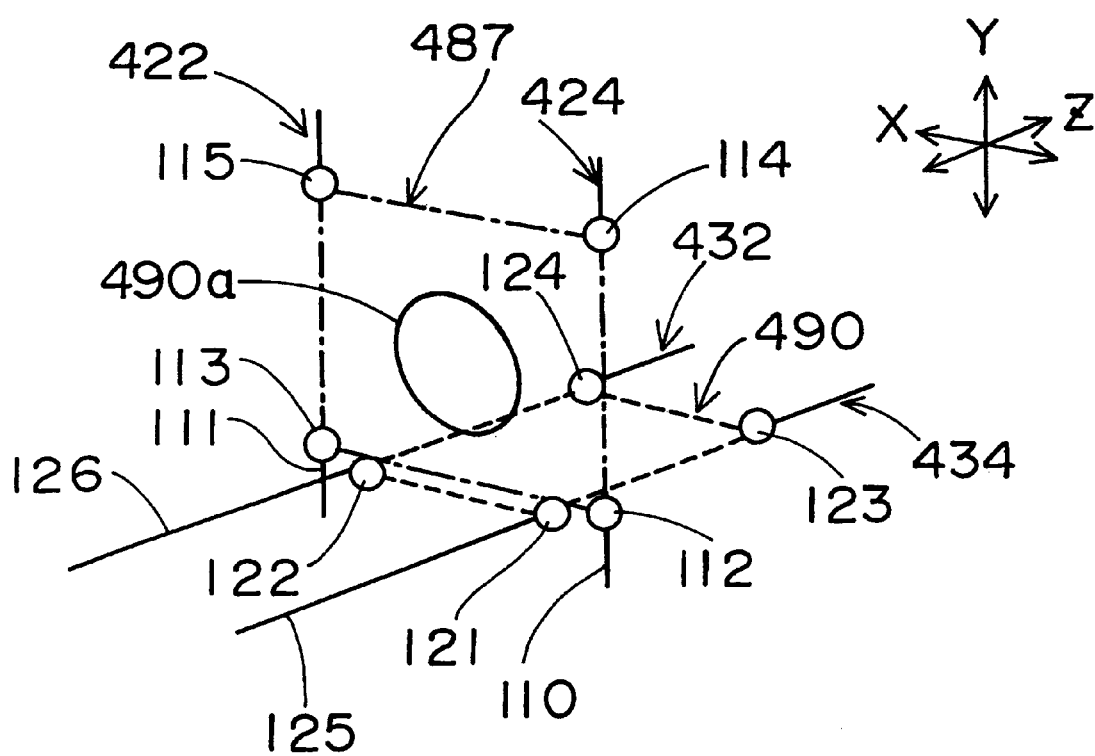
FIG. 4 is a schematic view showing a relationship between a saddle and a ram in another conventional machine tool driven by the linear motor shown in FIG. 4.

DETAILED DESCRIPTION OF THE PREFERRED EMBODIMENTS (First Embodiment)

A first embodiment of the present invention will be described with reference to the drawings. The same reference numerals will be attached to structure parts having the same function as that of the related art.

Figure 5:
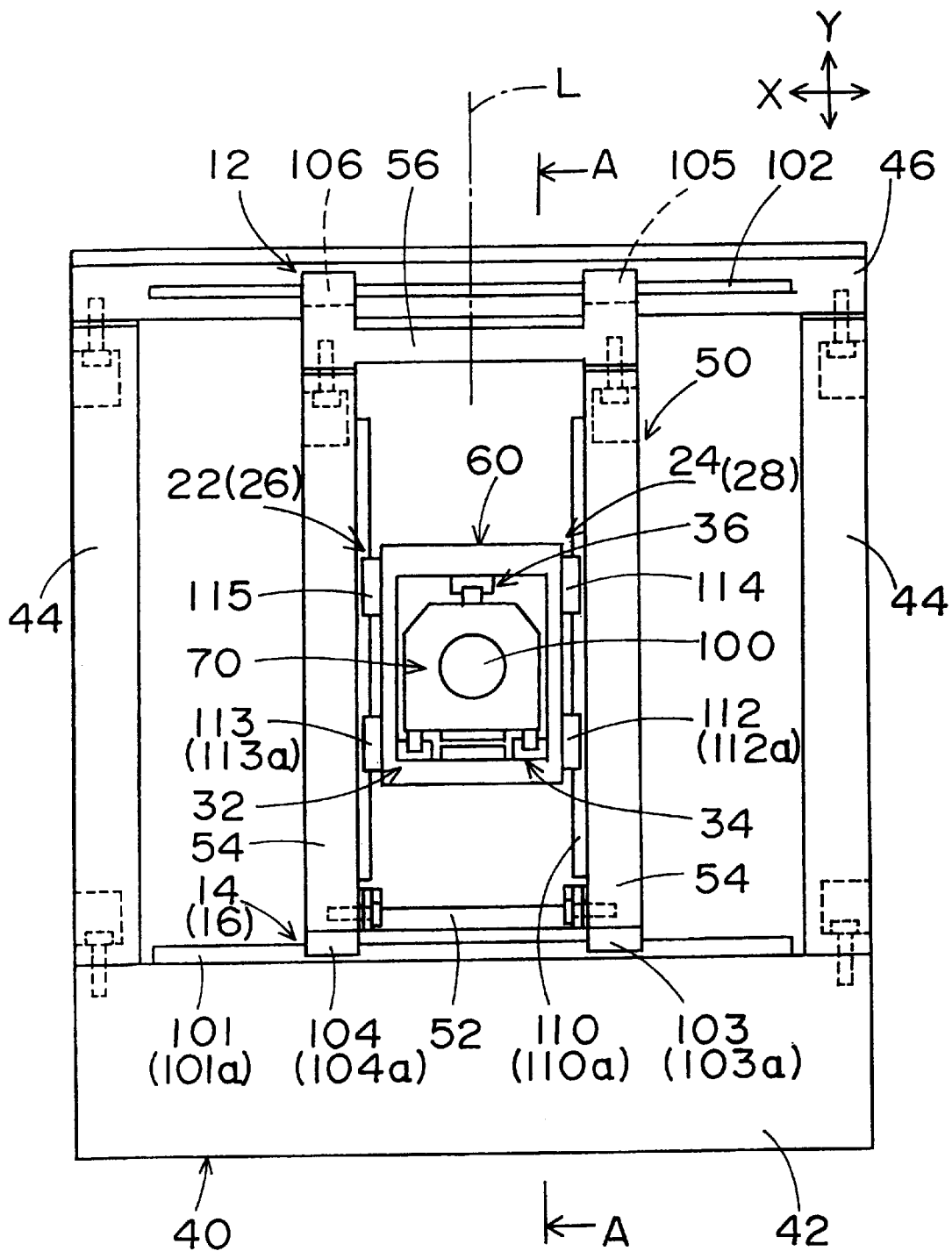
FIG. 5 is a schematically general front view of a machine tool driven by a linear motor according to a first embodiment of the present invention.
Figure 6:
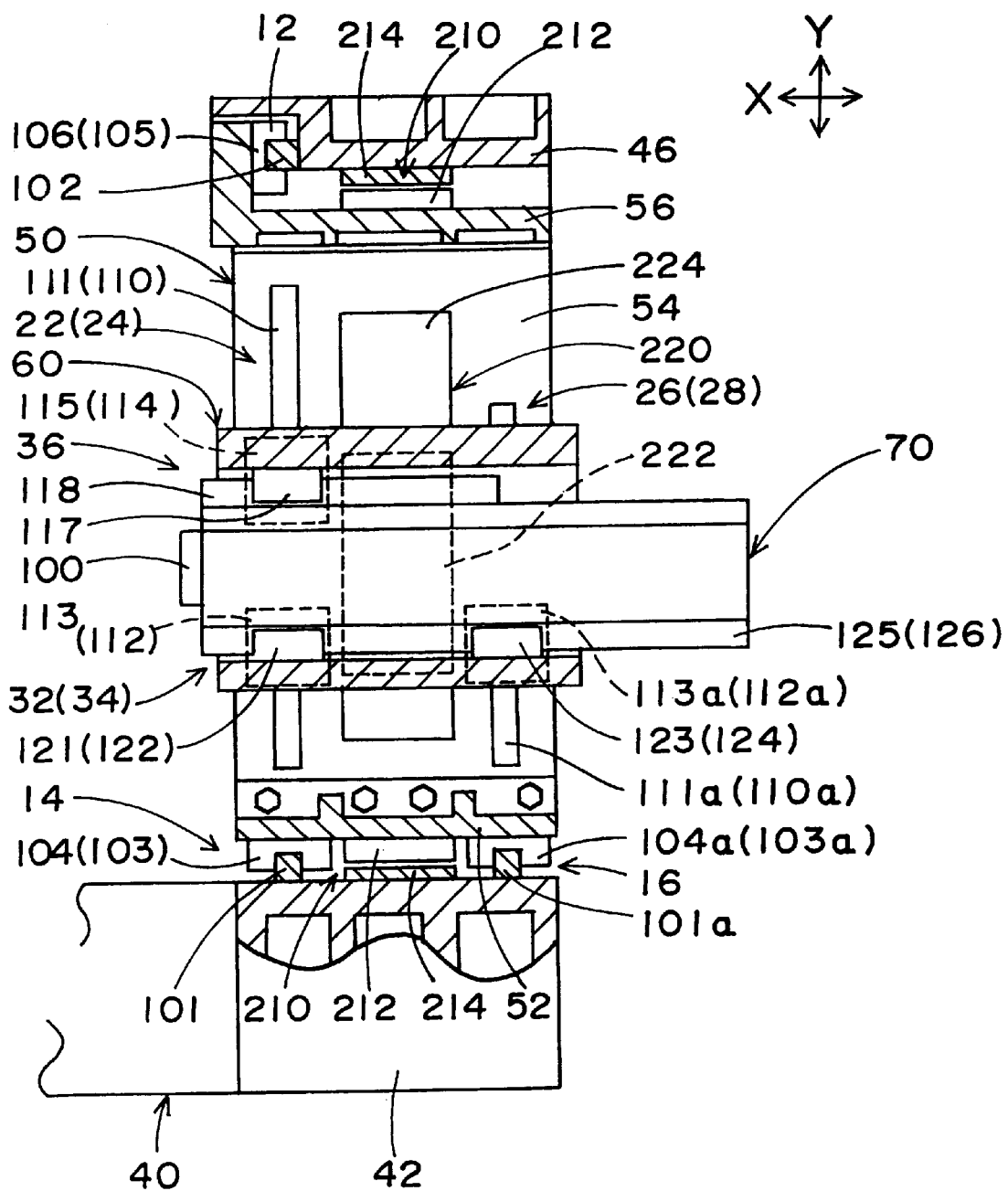
FIG. 6 is a cross sectional view along a line A—A shown in FIG. 5.

In FIGS. 5 and 6, a frame 40 is substantially assembled in a box shape by a base 42, right and left side members 44 and an upper member 46. A table for supporting a workpiece (not shown) is provided on a front portion of the base 42.

A gantry 50 disposed in an inner space of the frame 40 is substantially assembled in a vertical box shape by a lower member 52, right and left side members 54 and an upper member 56. A saddle 60 disposed in the inner space of the gantry 50 is substantially formed in a box shape. A ram 70 disposed in an inner space of the saddle 60 is substantially formed in a polygonal cylinder shape extending along a Z-axis. A tool spindle 100 is rotatably supported in a front end portion of the ram 70 around the Z-axis. In this configuration, a tool such a rotary cutting tool (not shown) having a milling cutter is attached to the tool spindle 100. In the ram 70, there is provided a built-in motor (not shown) for rotating the tool spindle 100.

Figure 9:
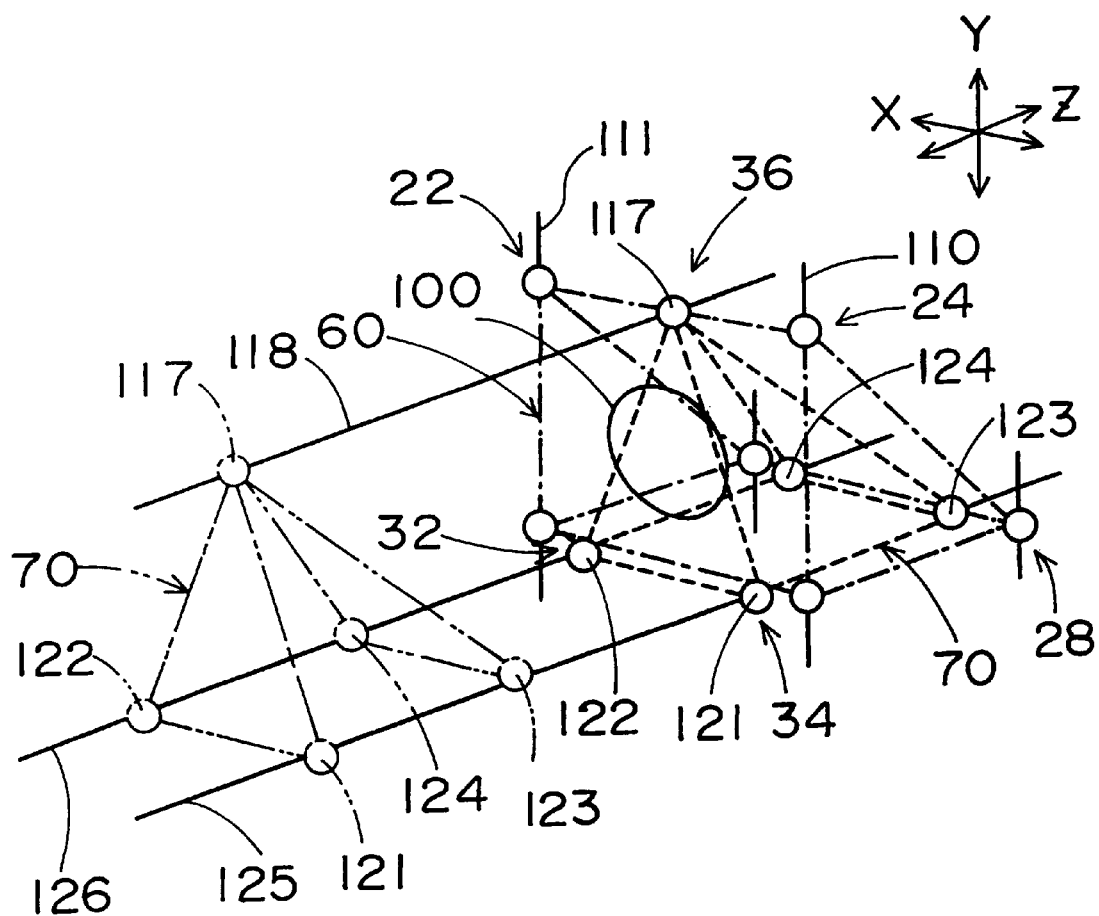
FIG. 9 is a schematic view showing a relationship between a saddle and a ram according to the first embodiment.

The gantry 50, the saddle 60 and the ram 70 are slidably provided through guide means described hereinafter on the frame 40 in the X-, Y- and Z-axis directions, respectively. In FIG. 9, the ram 70 at a forward position is shown by a two-dotted chain line.

Figure 8:
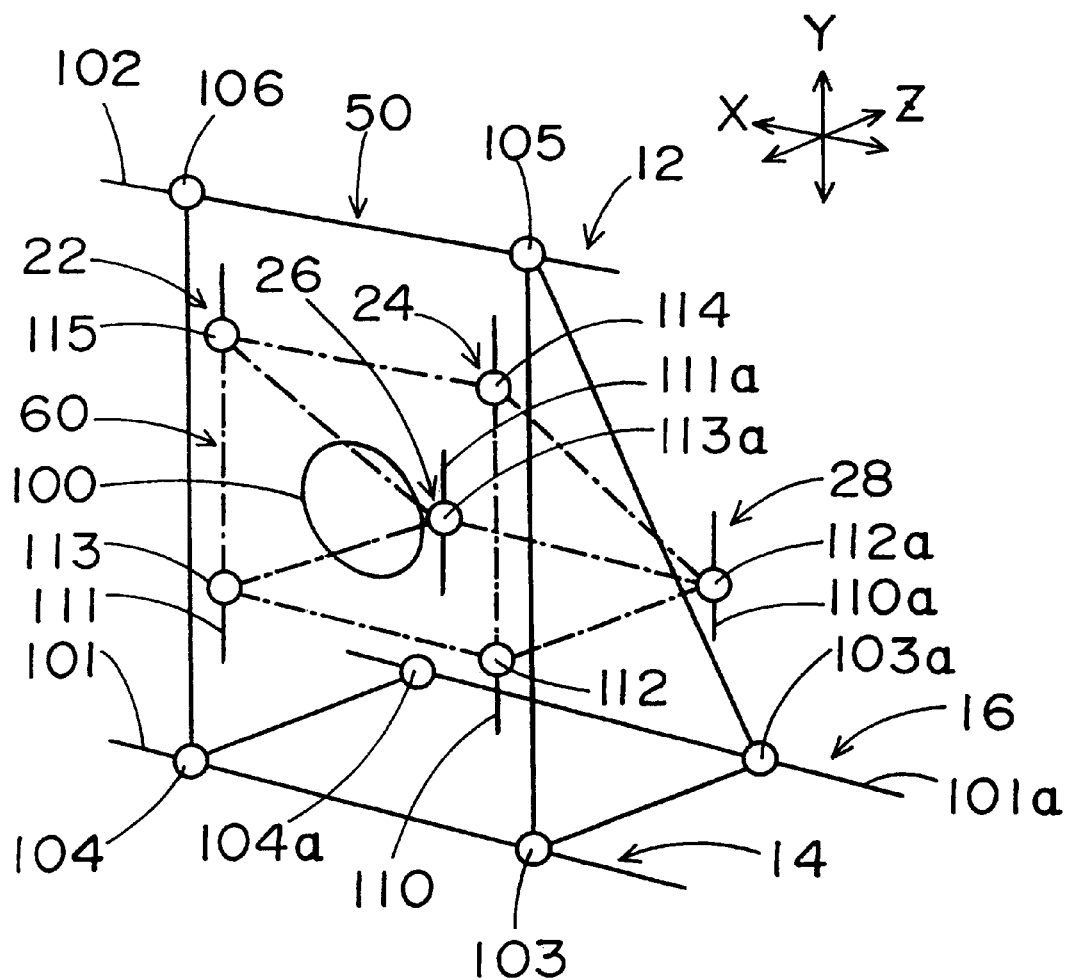
FIG. 8 is a schematic view showing a relationship between a gantry and a saddle according to the first embodiment.

In FIGS. 5, 6 and 8, the gantry 50 is slidably provided in the X-axis direction through three sets of X-axis linear guides 12, 14 and 16. The two sets of upper and lower front end X-axis linear guides 12 and 14 are in parallel arranged in the front of the frame 40 with holding the tool spindle 100 therebetween. The rear X-axis linear guide 16 is arranged at a rear portion of the frame 40 in parallel with the lower front end X-axis linear guide 14.

The lower front end X-axis linear guide 14 is composed of a straight rail 101 extending in the X-axis direction and right and left bearing blocks 103 and 104 slidably engaged therewith. The straight rail 101 is fixed to the base 42 of the frame 40, and the bearing blocks 103 and 104 are respectively fixed to lower surfaces of right and left side members 54 of the gantry 50.

The upper front end X-axis linear guide 12 is composed of a straight rail 102 fixed to the upper member 46 of the frame 40 and right and left bearing blocks 105 and 106 which are slidably engaged therewith and fixed to the upper member 56 of the gantry 50. Further, the rear X-axis linear guide 16 is composed of a straight rail 101a fixed to the upper surface of the base 42 of the frame 40 and right and left bearing blocks 103a and 104a which are slidably engaged therewith and fixed to the lower member 52 under the side members 54 of the gantry 50. Accordingly, in the lower surface of each of the side members 54, a step portion is formed in which a rear portion in the Z-axis direction is positioned at a position higher than a front portion, and both end portions of the lower member 52 in the X-axis direction are inserted to the step portion.

The X-axis guide means for slidably guiding the gantry 50 in the X-axis direction is composed of the three sets of X-axis linear guides 12, 14 and 16. As shown in FIG. 5, a center of each of the X-axis linear guides 12, 14 and 16 in the X-axis direction is positioned substantially on a center line L along the Y-axis perpendicular to a rotational center of the tool spindle 100.

A relationship of an arrangement in the bearing blocks 103, 103a, 104, 104a, 105 and 106 fixed to the gantry 50 will be mentioned with reference to a schematic view of FIG. 10. In FIG. 10, FIG. 10(a) is a left side view, FIG. 10(b) is a front view, FIG. 10(c) is a right side view and FIG. 10(d) is a plan view. The three bearing blocks 104, 104a and 106 illustrated in FIG. 10(a) are disposed in vertexes of a right-angled triangle as seen from the left side in the X-axis direction. Similarly, the three bearing blocks 103, 103a and 105 illustrated in FIG. 10(c) are disposed in vertexes of a right-angled triangle lines as seen from the right side in the X-axis direction, in the same manner as that of the bearing blocks 104, 104a and 106. Further, the four bearing blocks 103, 104, 105 and 106 illustrated in FIG. 10(b) are disposed on the same plane perpendicular to the Z-axis. Furthermore, the four bearing blocks 103, 103a, 104 and 104a illustrated in FIG. 10(d) are disposed on the same plane perpendicular to the Y-axis.

Figure 7:
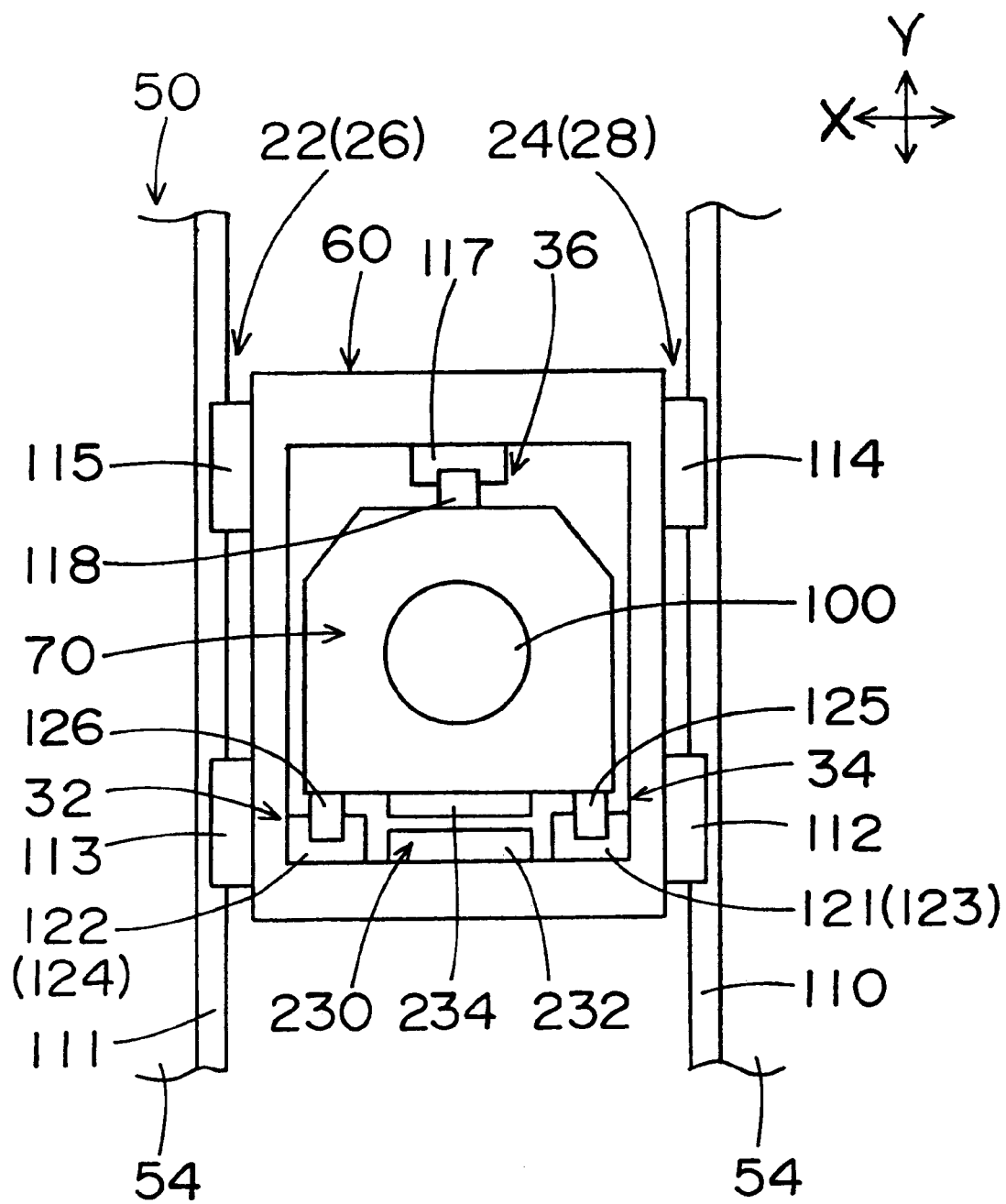
FIG. 7 is a front view showing a peripheral portion of a saddle according to the first embodiment.

In FIGS. 5, 7 and 8, the saddle 60 is slidably provided in the Y-axis direction in the gantry 50 through a pair of left and right front Y-axis linear guides 22 and 24 and a pair of left and right rear Y-axis linear guides 26 and 28. The left and right front Y-axis linear guides 22 and 24 are disposed in parallel to the X-axis direction, holding the tool spindle 100 therebetween. Further, the left and right rear Y-axis linear guides 26 and 28 are disposed at a rear side of the front Y-axis linear guides 22 and 24 in parallel to the X-axis direction. In such a construction, the left and right Y-axis linear guides 22, 26, 24 and 28 are disposed symmetrically to the Y-axis perpendicular to the rotational axis of the tool spindle 100.

The right front Y-axis linear guide 24 is composed of a straight rail 110 extending along the Y-axis and lower and upper bearing blocks 112 and 114 slidably engaged therewith. The straight rail 110 is fixed to the side member 54 at the right end portion of the gantry 50, and the bearing blocks 112 and 114 are fixed to a side surface of the saddle 60. Similarly, the left front Y-axis linear guide 22 is composed of a straight rail 111 fixed to the side member 54 at a left end portion of the gantry 50 and the lower and upper bearing blocks 113 and 115 which are slidably engaged therewith and fixed to a side surface of the saddle 60.

The right rear Y-axis linear guide 28 is composed of a straight rail 110a extending along the Y-axis, and a bearing block 112a slidably engaged therewith. The straight rail 110a is fixed to the side member 54 at the right end portion of the gantry 50, and the bearing block 112a are fixed to the side surface of the saddle 60. Similarly, the left rear Y-axis linear guide 26 is composed of a straight rail 111a fixed to the side member 54 at the left end portion of the gantry 50, and the bearing block 113a which are slidably engaged therewith and fixed to the side surface of the saddle 60.

Y-axis guide means for slidably guiding the saddle 60 in the Y-axis direction consists of the four Y-axis linear guides 22, 24, 26 and 28 described above.

A positional relationship between the bearing blocks 112, 112a, 113, 113a, 114 and 115 fixed to the saddle 60 will be described with reference to FIG. 11. FIG. 11(a) is a left side view, FIG. 11(b) is a front view, FIG. 11(c) is a right side and FIG. 11(d) is a plan view. The bearing blocks 113, 113a and 115 illustrated in FIG. 11(a) are disposed in vertexes of a right-angled triangle as seen from a left side in the X-axis direction. The front bearing blocks 113 and 115 of the three are disposed on the same plane perpendicular to the Z-axis together with the left front end two bearing blocks 104 and 106 (refer to FIG. 10(a)) in the X-axis guide means.

Figures 11A, 11B, 11C, 11D:
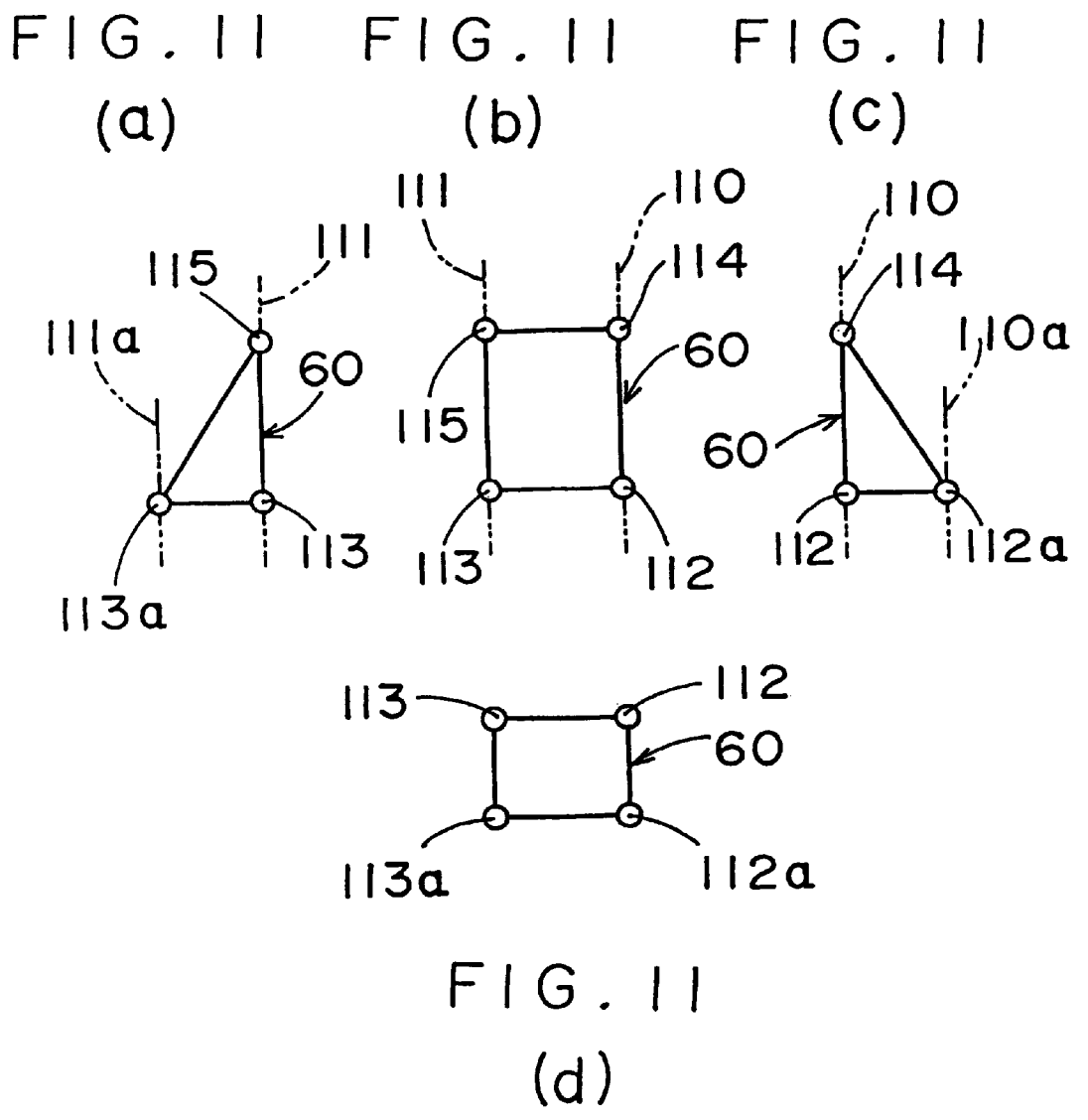

Similarly, the bearing blocks 112, 112a and 114 illustrated in FIG. 11(c) are disposed in vertexes of a right-angled triangle lines as seen from the right side in the X-axis direction. The front bearing blocks 103 and 105 of the three are disposed on the same plane perpendicular to the Z-axis together with the right front bearing blocks 112 and 114 (refer to FIG. 10(c)) in the X-axis guide means.

Further, the bearing blocks 112, 113, 114 and 115 illustrated in FIG. 11(b) are disposed on the same plane perpendicular to the Z-axis. Furthermore, the bearing blocks 112, 112a, 113 and 113a illustrated in FIG. 11(d) are disposed on the same plane perpendicular to the Y-axis.

In FIGS. 6, 7 and 9, the ram 70 is slidably provided in the Z-axis direction in the saddle 60 through three pairs of Z-axis linear guides 32, 34 and 36. The left and right Z-axis linear guides 32 and 34 are disposed in parallel to the X-axis direction at a lower portion of the tool spindle 100. Further, the upper Z-axis linear guide 36 is disposed above the tool spindle 100 in parallel to the lower Z-axis linear guides 32 and 34 in the Y-axis direction. As shown in FIG. 5, the left and right Z-axis linear guides 32 and 34 are disposed symmetrically to the X-axis direction around the center line L along the Y-axis perpendicular to the rotational axis of the tool spindle 100. Further, the linear guide 36 is substantially positioned on the center line L.

As shown in FIGS. 6, 7 and 9, the right lower Z-axis linear guide 34 is composed of a straight rail 125 extending along the Z-axis, and front and rear bearing blocks 121 and 123 slidably engaged therewith. The straight rail 125 is fixed to a bottom surface of the ram 70, and the bearing blocks 121 and 123 are fixed to a right lower portion of the saddle 60. Similarly, the left lower Z-axis linear guide 32 is composed of a straight rail 126 fixed to the bottom surface of the ram 70 and front and rear bearing blocks 122 and 124 which are slidably engaged therewith and fixed to a left lower portion of the saddle 60.

The upper Z-axis linear guide 36 is composed of a straight rail 118 extending along the Z-axis and a bearing block 117 slidably engaged therewith. The straight rail 118 is fixed to an upper surface of the ram 70, and the bearing block 117 is fixed to a upper inside surface of the saddle 60.

The Z-axis guide means for slidably guiding the ram 70 along the Z-axis consists of the three sets of Z-axis linear guides 32, 34 and 36 as described above.

A positional relationship between the bearing blocks 121, 122, 123, 124 and 117 fixed to the saddle 60 will be described with reference to FIG. 12. FIG. 12(a) is a left side view, FIG. 12(b) is a front view, FIG. 12(c) is a right side view and FIG. 12(d) is a plan view. The bearing blocks 117, 122 and 124 illustrated in FIG. 12(a) are disposed in vertexes of a right-angled triangle as seen from a left side in the X-axis direction. Similarly, the bearing blocks 117, 121 and 123 illustrated in FIG. 12(c) are disposed in vertexes of a right-angled triangle as seen from the right in the X-axis direction.

Further, the bearing blocks 117, 121 and 122 illustrated in FIG. 12(b) are disposed on the same plane perpendicular to the Z-axis and in vertexes of an isosceles triangle (including an equilateral triangle). Moreover, bearing blocks 121, 122, 123 and 124 illustrated in FIG. 12(d) are disposed on the same plane perpendicular to the Y-axis.

The gantry 50, the saddle 60 and the ram 70 are respectively driven in the axial directions thereof by a well-known linear motor. More particularly, as shown in FIG. 6, upper and lower X-axis linear motors 210 vertically symmetrically disposed in the Y-axis direction are provided between the frame 40 and the gantry 50. The X-axis linear motor 210 has a coil stator 212 provided on the gantry 50 and a magnet 214 provided on the frame 40. Similarly, left and right Y-axis linear motors 220 (only a left motor is shown in FIG. 6) laterally symmetrically disposed are provided between the gantry 50 and the saddle 60. The Y-axis linear motor 220 has a coil stator 222 provided on the saddle 60 and a magnet 224 provided on the gantry 50. Further, as shown in FIG. 7, a Z-axis linear motor 230 is provided between the saddle 60 and the ram 70. The Z-axis linear motor 230 has a coil stator 232 provided on the saddle 60 and a magnet 234 provided on the ram 70.

In the above-described machine tool according to the first embodiment of the present invention, the X-axis guide means is provided with three bearing blocks 104, 104a and 106 (refer to FIG. 10(a)) and 103, 103a and 105 (refer to FIG. 10(c)) arranged at in vertexes of a right-angled triangle. Similarly, the Y-axis guide means is provided with three bearing blocks 113, 113a and 115 (refer to FIG. 11(a)) and 112, 112a and 114 (refer to FIG. 11(c)) arranged at vertexes of a right-angled triangle. Further, the Z-axis guide means is provided with three bearing blocks 117, 122 and 124 (refer to FIG. 12(a)) and 117, 121 and 123 (refer to FIG. 12(c)) arranged at vertexes of a right triangle. Accordingly, the cutting force acting on the tool spindle 100 can be equivalently worked on the gantry 50, the saddle 60 and the ram 70 through the respective guide means. Therefore, the rigidity of the gantry 50, the saddle 60 and the ram on which the cutting force acting on the tool spindle 100 is worked can be increased without increasing the weight excessively. As a result, each weight of the gantry 50, the saddle 60 and the ram 70 can be reduced. This can enhance speed and acceleration of the gantry 50, the saddle 60 and the ram 70 in the linear motor drive type machine tool as shown in this embodiment.

Further, among the guide means for the X-axis, the Y-axis and the Z-axis, it is sufficient that at least one guide means is provided with three bearing blocks disposed in vertexes of a triangle formed by three straight lines as seen from the X-axis direction. The slide member slidably guided by the guide means provided with the bearing blocks can be constructed to have high rigidity and reduced weight. Still further, it is considered that the triangle structured such that three bearing blocks are disposed in vertexes thereof as seen from the X-axis direction and provided in the guide means may be an isosceles triangle and an inequilateral triangle in addition to a right triangle. In this case, it is not preferable to provide four or more bearing blocks disposed in vertexes of a polygon more than a tetragon formed by four or more straight lines as seen from the X-axis direction in the guide means since it may increase the weight unnecessarily in spite of high rigidity of the slide member, resulting in the problem of weight reduction kept unsolved.

Still further, two bearing blocks 103, 105, 104, 106 (refer to FIGS. 10(a) and 10(c)) among three disposed vertexes of a triangle as seen from the X-axis direction in the X-axis guide means, and two bearing blocks 112, 114, 113, 115 (refer to FIGS. 11(a) and 11(c)) among three disposed in vertexes of a triangle as seen from the X-axis direction in the Y-axis guide means are disposed on the same vertical plane perpendicular to the Z-axis. The gantry 50 provided through the X-axis guide means and the saddle 60 provided through the Y-axis guide means can be arranged in a compact manner with respect to the Z-axis.

Furthermore, the Z-axis guide means has three bearing blocks 117, 121, 122 (refer to FIG. 12(b)) disposed in three vertexes of an isosceles triangle having a bottom line as a horizontal line and formed by three straight lines as seen from the Z-axis direction. High rigidity of the ram 70 that bears the cutting force acting on the tool spindle 100 can be secured by the bearing blockes as least as possible.

It can be easily understood that the present invention is not limited to the embodiment described above, and can be modified within the scope of the present invention. For example, the present invention can be applied to the drive system other than the linear motor drive type, that is, a machine tool of a motor drive type utilizing a ball screw or a rack and pinion.

(Second Embodiment)

A second embodiment of the present invention will be described hereinafter with reference to the drawings.

Figure 13:
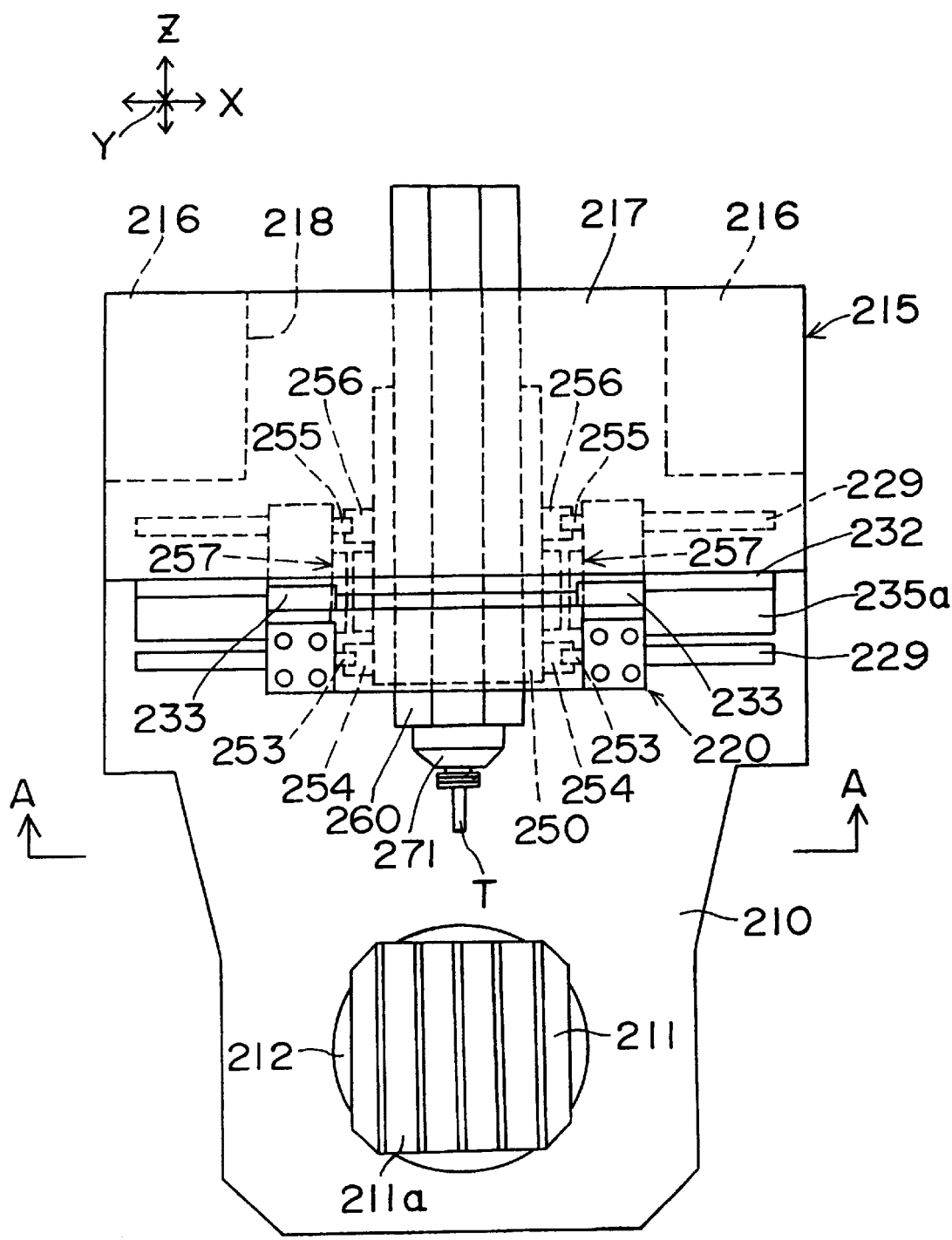
FIG. 13 is a plan view showing a machine tool driven by a linear motor according to a second embodiment of the present invention.
Figure 14:
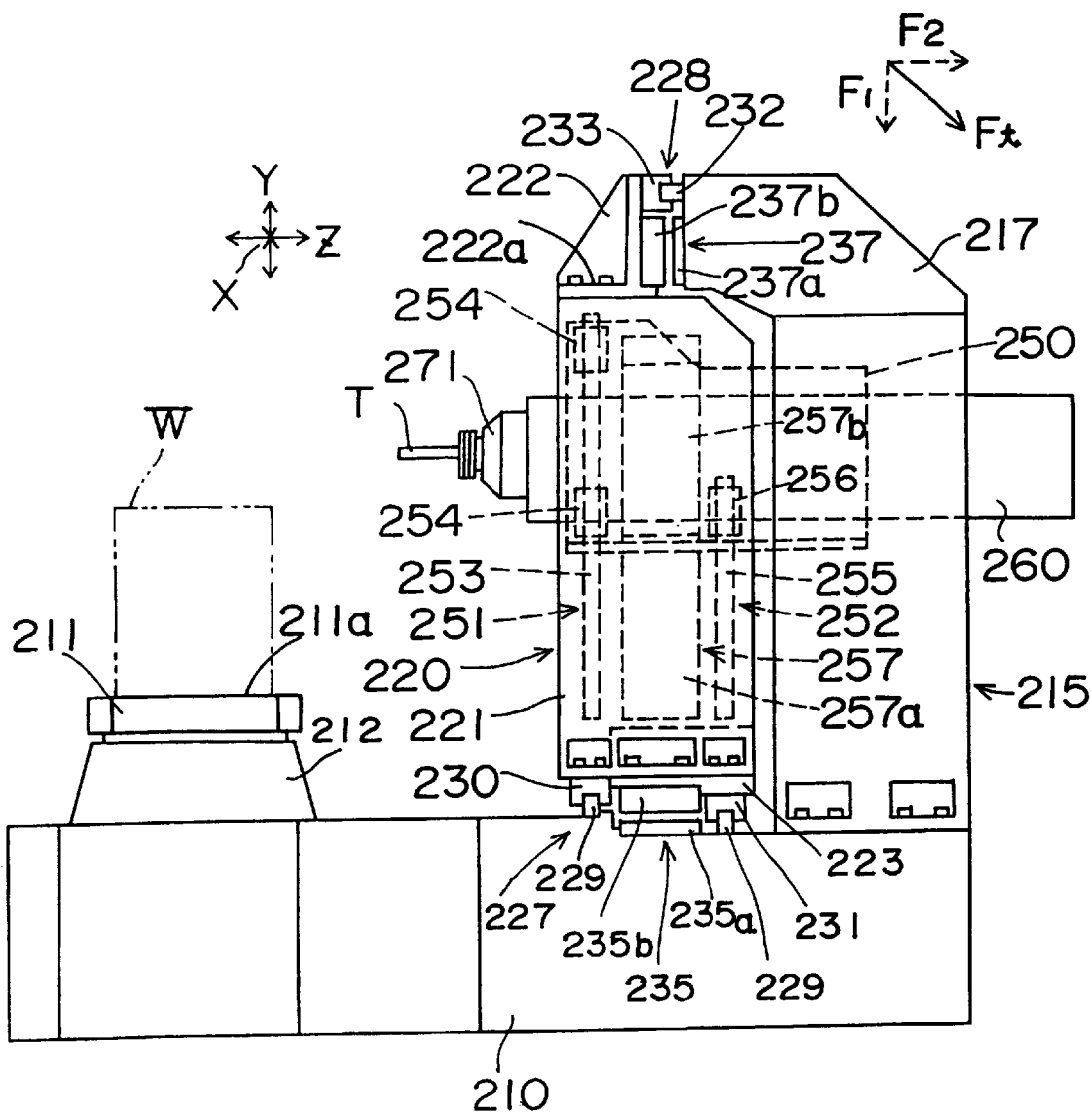
FIG. 14 is a right side view showing a machine tool driven by a linear motor according to the second embodiment.
Figure 15:
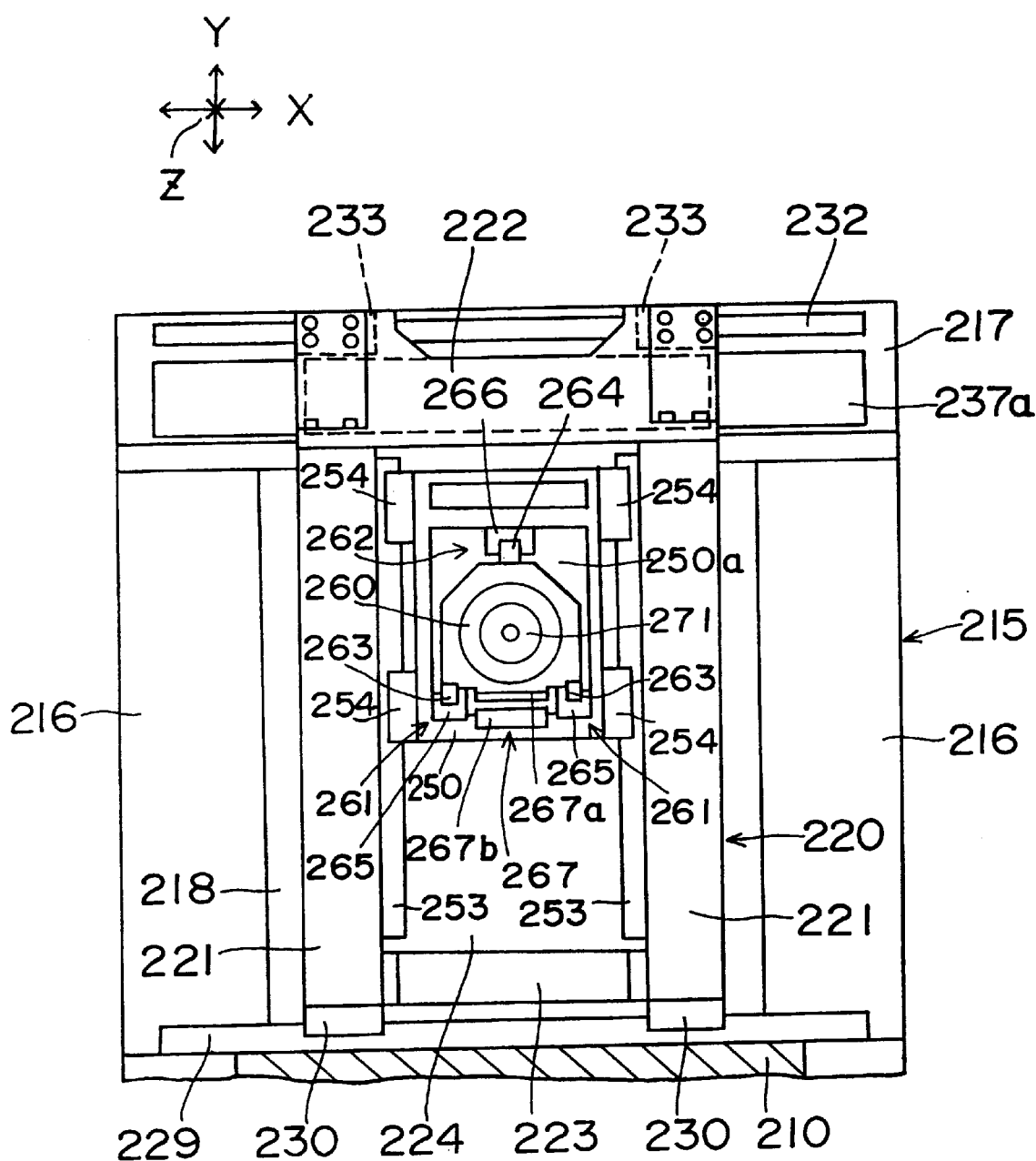
FIG. 15 is a sectional front view along an arrow line of A—A according to the second embodiment shown in FIG. 13.

FIGS. 13 to 15 respectively represent a plan view, a right side view and a front view of a linear motor drive type machine tool in accordance with the second embodiment of the present invention. In this embodiment, a machine tool is mainly composed of a work table 211, a base 210, a fixing frame 215, a gantry 220, a ram 260, linear motors 235, 237, 251, 252 and 267, and a tool spindle 271. The work table 211 is disposed in the front of a base 210, and the fixing frame 215 is disposed at the back thereof. The gantry 220 is slidably guided in an X-axis direction by the base 210 and the fixing frame 215 at a front side thereof, and the saddle 250 is slidably guided in a Y-axis direction by the gantry 220. The ram 260 is slidably guided in a Z-axis direction by the saddle 250, in which the tool spindle 271 is rotatably supported. The gantry 220, saddle 250 and ram 260 are driven by three sets of the linear motors 235, 237, 251, 252 and 267, respectively.

The work table 211 is supported at an upper surface of a front portion of the base 210 by a table supporting mechanism 212, and has a mounting surface 211a on which a workpiece W is mounted. The table supporting mechanism 212 may be structured to simply fix and hold the work table 211, however, it is preferable to be structured to install a well-known index mechanism (not shown) therein.

The index mechanism may be configured so as to rotate the work table 211 around the Y-axis at every 90 degrees. However, the mechanism may be configured so as to rotate at a random angular position by a servo motor (not shown) numerically controlled by a numerical control apparatus (not shown). Further, the table supporting mechanism 212 can employ various kinds of aspects including an aspect of dividing the work table 211 around an axis in parallel with or perpendicular to a rotational axis of the tool spindle 271 described below.

The fixing frame 215 is arranged on an upper surface of a rear portion of the base 210 having a width slightly wider than a front surface width of a front portion disposing the work table 211. As shown in FIG. 15, the fixing frame 215 is composed of two column members 216 apart from each other in the X-axis direction, and a cross beam 217 which lower end surface is removably connected with each upper end surface of the column members 216 by mean of bolts and nuts (not shown). In such a configuration, a rectangular window 218 (a first opening portion) opens in the Z-axis direction, which is defined by a rear upper surface of the base 210, inner opposing surfaces of the column members 216 and a lower end surface of the cross beam 217.

In the front of the fixing frame 215, there is provided a gantry 220 having a rectangular window 224 (a second opening portion), in which both the first and second rectangular windows 218 and 224 are overlapped each other in the X-axis direction, as shown in FIG. 15. A lower end surface and back surface of an upper portion of the gantry 220 are slidably guided in the X-axis direction by the base 210 and the fixing frame 215, respectively. The gantry 220 is constituted in the form of a box by right and left beam members 221 and upper and lower beam members 222 and 223, and the rectangular window 224 opens in the X-axis direction.

Figure 16:
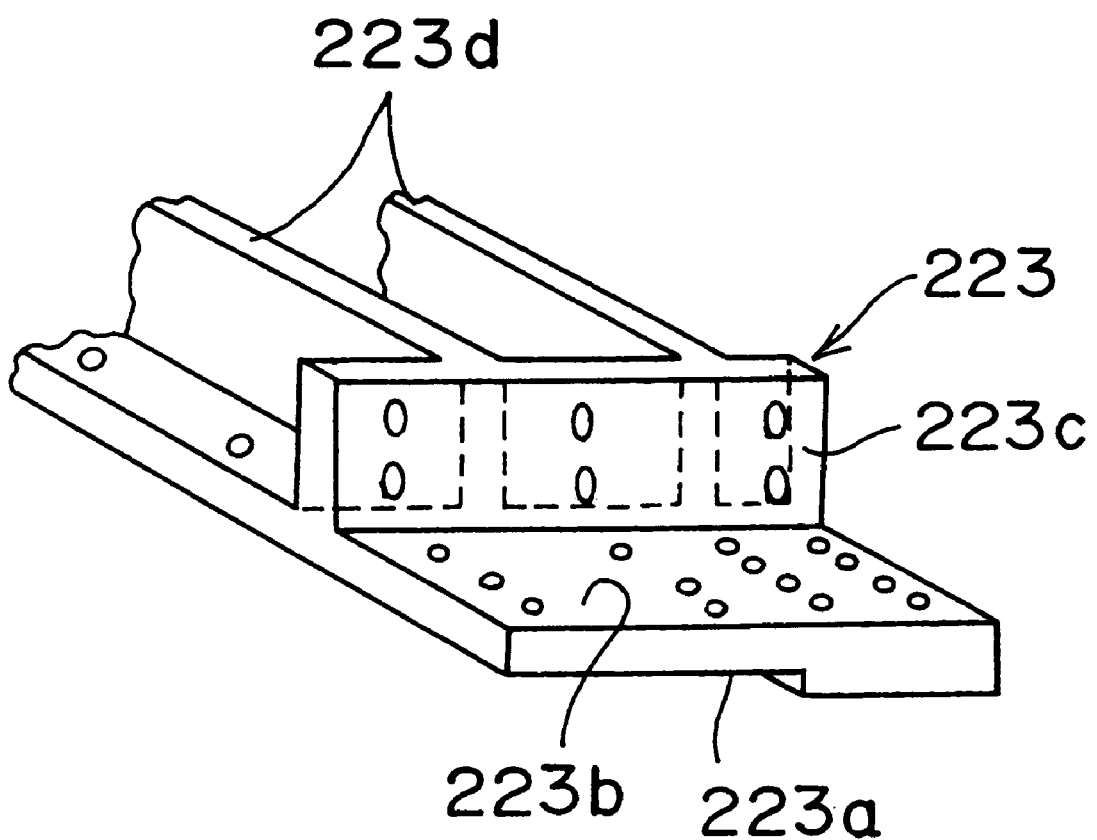
FIG. 16 is a perspective view showing a right end portion of a lower beam member constituting a gantry according to the second embodiment.

In detail, a Z-axis direction width of the lower beam member 223 is smaller than that of the beam member 221, a lower surface of which is formed as a stepped surface 223a having a front side thinner than a rear side for mounting a coil unit of a linear motor described hereafter, as shown in FIG. 16. On the upper surface at both end portion of the lower beam member 223, there are formed a seat surface 223b seating the lower end of the beam member 221 seats thereon, and a receiving surface 223c for receiving an inner surface of the lower end portion of the beam member 221 are formed. The right and left receiving surfaces 223c are integrally connected by rims 223d.

Figure 17:
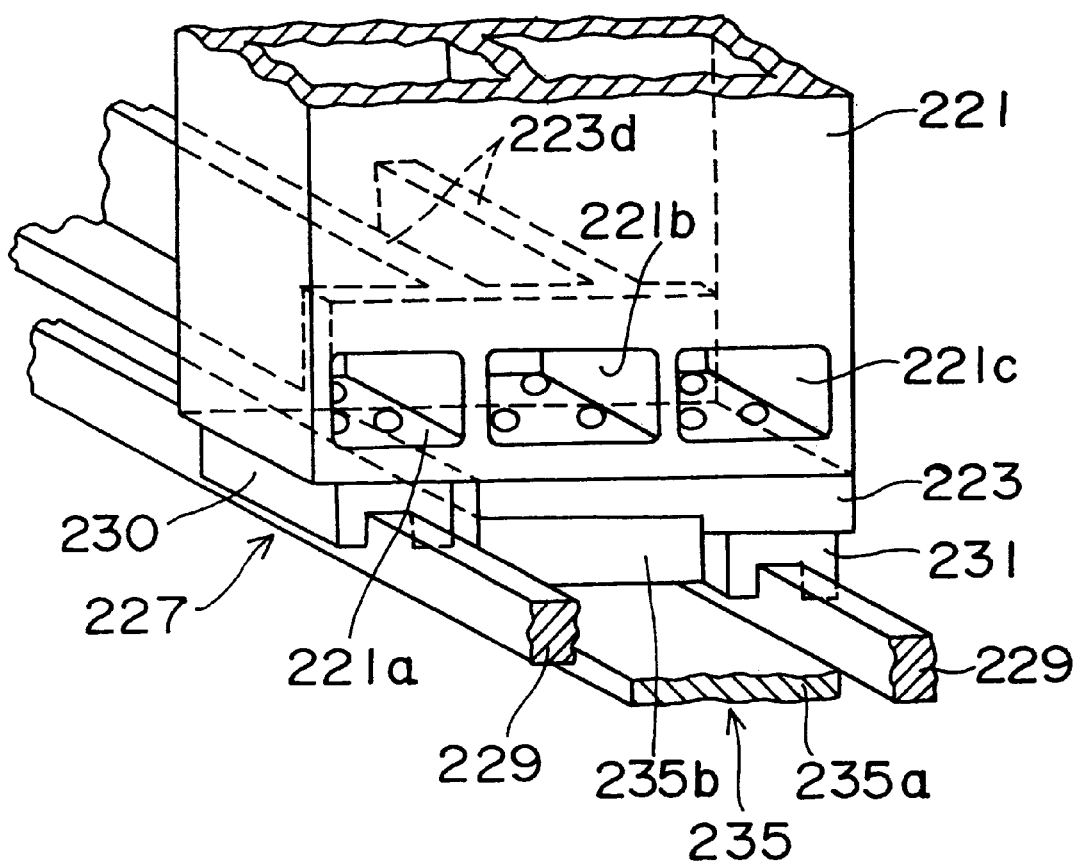
FIG. 17 is a perspective view showing a relationship between a vertical beam member and a lower beam member constituting a gantry according to the second embodiment.
Figure 18:
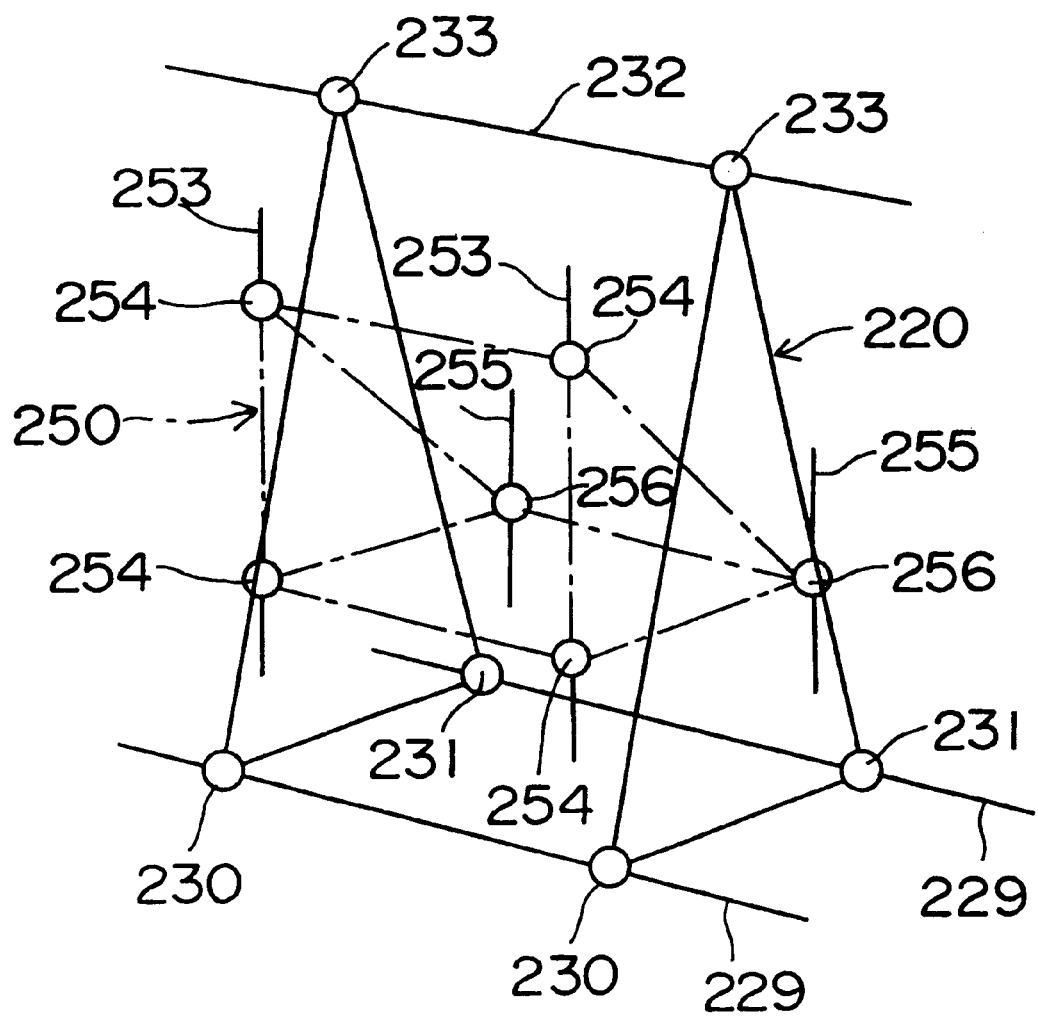
FIG. 18 is an explanatory view showing a relationship between an arrangement of a bearing block for guiding a saddle in a Y-axis direction and an arrangement of a bearing block for guiding a gantry in an X-axis direction according to the second embodiment.

The lower end portions of the beam members 221 are respectively fixed on the seat surfaces 223b of the lower beam member 223, as shown in FIG. 17. Namely, this fixation is performed by inserting bolts from pockets 221b and 221c open at an outer end surface of a lower portion of the beam member 221 and screwing the bolt into a screw hole (a reference numeral is omitted) open to the seat surface 223b. An inner surface of a lower end portion of -the beam member 221 is removably connected to the receiving surface 223c of the lower and horizontal beam member 223. This connection is performed by inserting bolts into the receiving surface 223c from a side of the rim 223d and screwing the bolts into a screw hole of the beam member 221.

The beam members 221 are connected to the upper beam member 222 by detachably fixing both end portions of the beam members 221 to the upper end surface of the upper beam member 222. More specifically, the bolt is inserted from a portion 222a of an end of the upper beam member 222 through a portion 222a so as to be screwed into screw holes with the upper end of the beam member 221. As described above, the left and right beam members 221 and the upper and lower beam members 222 and 223 are assembled in a box shape, so that the rectangular window 224 is defined by the inner surfaces of the right and left beam members 221 opposite to each other and the lower surface and upper surface of the upper and lower beam members 222 and 223 opposite to each other.

A linear guide mechanism 227 as lower guide means is provided between a portion on the base 210 in the front of the fixing frame 215 and a lower surface of the gantry 220. On the other hand, a linear guide mechanism 228 as upper guide means is provided between an upper front surface of the fixing frame 215 and an upper back surface of the gantry 220. The lower guide mechanism 227 comprises two straight rails 229 fixed to the base 210 in parallel in the X-axis direction and a pair of bearing blocks 230 and 231 running on each of the rails 229.

The pair of front bearing blocks 230 disposed in the front of the base 210 are directly mounted to the lower end surface of the beam members 221. This attachment is performed by inserting bolts from the pocket 221a shown in FIG. 17 through the lower end surface of the beam member 221 so as to be screwed into the screw hole in the bearing block 230.

The rear right and left bearing blocks 231 are mounted to a lower surface of each of the seat surfaces 223b of the lower beam member 223 immediately below the beam member 221. This attachment is performed prior to connection of the beam member 221 with the lower beam member 223, and performed by the insertion of the bolts from the upper surface end of the seat surface 223b through the lower beam member 223 so as to be screwed into the screw hole open to the upper surface of the bearing block 231. In this case, for example, a bolt with a hexagonal hole is used as the bolt, and a head portion thereof is arranged not to project from the seat surface 223b.

As understood, the upper surface of the base 210 for mounting the rear guide rail 229 is constructed to be dropped down by the amount equal to the thickness of the seat surface 223b in comparison with the mounting of the guide rail 229, due to the relationship in that the bearing block 231 is mounted to the beam member 221.

The upper guide mechanism 228 comprises a single guide rail 232 extending along the X-axis in parallel with the guide rail 229 and fixed to the front surface of the cross beam 217, and a pair of right and left bearing blocks 233 running thereon. In order to dispose the guide rail 232 at a middle position in the width of the gantry 220 along the Z-axis, that is, a middle position in the Z-axis direction between a pair of lower guide rails 229, the cross beam 217 projects forward so as to cover over substantially half of the rear end of the upper end of the vertical beam member 221 at the front end.

For the same purpose, a width of the upper and horizontal beam member 222 of the gantry 220 along the Z-axis is decreased to a degree about a half of the width of the vertical beam member 221 in the same direction, and both ends in the longitudinal direction is detachably secured to the upper surface of the vertical beam member 221 by a bolt (not shown) in a manner mentioned above in a state that the front end edge thereof is shifted to the front half end of the upper surface of the vertical beam member 221 in such a manner to substantially align with the front surface of the vertical beam member 221. The upper and horizontal beam member 222 has a vertical back surface 222b, and respectively mounts the bearing blocks 233 to the longitudinal both end portions of the vertical back surface 222b disposed immediately above the vertical beam member 221 (refer to FIG. 15).

One of the features in the embodiment of the present invention is that the fixing frame 215 is structured to guide the back surface of the upper portion of the gantry 220. This structure makes it possible to set the upper end of the gantry 220 to have substantially the same height as that of the upper end of the fixing frame 215. The height of the whole machine tool is decreased under a condition where a desired stroke in the Y-axis direction of the saddle 250 is secured so as to contribute to compact size and enhanced rigidity of the machine tool.

Further, as one of the other features in the embodiment of the present invention, the gantry 220 is disposed forward of the fixing frame 215 rather than within the rectangular window 218 of the fixing frame 215, and preferably, both ends of the lower guide rail 229 and the upper guide rail 232 are extended to the front side of the column member 216 at the corresponding side. Accordingly, the gantry 220 can proceed forward to lap each of the left and right vertical beam members 221 with the front end of the column member 216 in the corresponding end of the fixing frame 215. An interval of the column member 216 along the X-axis is narrowed under a condition where a desired stroke in the X-axis direction of the gantry 220 is secured. The opening portion located in front of the machine tool can, thus, be narrowed.

The linear guide mechanism 228 constituted by the guide rail 232 and the bearing block 233 is mounted in a direction opposing to the maximum load acting on the Z-axis. The linear guide mechanism 228 is mounted in the direction opposing to the maximum load exerted to the Z-axis. Meanwhile a pair of lower linear guide mechanism 227 is mounted in the direction opposing to the maximum load exerted to the Y-axis direction. The direction of mounting the linear guide mechanism 228 is, thus, different from that of the linear guide mechanism 227 by 90 degrees. This structure represents one of other features of the embodiments of the present invention.

The gantry 220 is driven by each of a lower electric linear motor 235 and an upper electric linear motor 237 synchronously controlling a lower end and an upper end portions. The lower linear motor 235 is constituted by a fixed magnetic plate unit 235a disposed on the base 210 along two guide rails 229 therebetween, and an electromagnetic coil unit 235b mounted on the lower surface of the lower and horizontal beam member 223, which opposes thereto. The magnetic plate unit 235a is structured to dispose a plurality of magnetic plates in series in the movement direction of the gantry 220.

On the contrary, the upper linear motor 237 is constituted by a fixed magnetic plate unit 237a disposed in the front surface of the cross beam 217 of the fixing frame 215 along the guide rail 232, and an electromagnetic coil unit 237b mounted on the back surface of the upper and horizontal beam member 222 of the gantry 220 which opposes thereto.

These linear motors 235 and 237 synchronously control the coil units 235b and 237b by a numerical control apparatus (not shown) and operate so as to move the gantry 220 on the base 210 and the fixing frame 215 by moving a magnetically energizing relation between the coils units 235b and 237b, and the magnetic plate units 235a and 237a opposing thereto in accordance with the NC program to the advancing direction. In this feeding process, the coil unit 235b generates a magnetic force so as to be attracted to the magnetic plate unit 235a, thereby pressing the gantry 220 to the base 210 downward. On the contrary, the coil unit 237b generates a magnetic force, thereby pressing the gantry 220 to the cross beam 217 of the fixing frame 215 backward.

As one of the other features of the embodiment in accordance with the present invention, the upper and lower linear motors 235, 237 are disposed in a center of gravity of the gantry 220, preferably in the middle portion of the width thereof in the Z-axis direction so as to drive the upper and lower end portions within the vertical surface passing through the gantry 220 and a center of gravity of an assembly of the mechanism vertically moving therewith.

As one of the further features of the embodiment in accordance with the present invention, a combination force of attraction forces F1, F2 generated by the linear motors 235 and 237 operates so as to press the gantry 220 downward in an oblique backward direction, as shown by an arrow Ft in FIG. 14. Accordingly, even in the case where the cutting force acting on the tool spindle 271 operates in a direction of lifting the gantry 220 upward or in the case where the cutting force intermittently changes, the gantry 220 is firmly held to the base 210 and the fixing frame 215 so as not to be moved in a vertical (Y) direction and a back-and-forth (Z) direction. As a result, the gantry 220 is prevented from moving in the back-and-forth direction and the vertical direction with respect to the base 210 and the fixing frame 215 owing to a gap existing in a sliding fitting portion between the guide rails 229, 232 and the bearing blocks 230, 231, 233, thereby securing a high working accuracy.

The saddle 250 similarly formed in a box shape is guided within the vertically rectangular window 224 of the gantry 220 so as to freely move in the vertical direction. The guide mechanism is constituted by a linear guide mechanism 251 corresponding to front portion guide means provided in the front portion of the inside opposing end surface of the vertical beam member 221 in the gantry 220, and a linear guide mechanism 252 corresponding to rear portion guide means similarly provided in the rear portion of the opposing end surface. A pair of guide rails 253 constituting the front portion guide mechanism 251 have a total length substantially equal to a width in the direction of the height of the vertically rectangular window 224, and are respectively fixed to the inside opposing surface in the front portion of the vertical beam member 221. The bearing blocks 254, 254 freely moving on each of the guide rails 253 are respectively secured to the upper and lower end portions on the side surface of the saddle 250 opposing to the guide rails.

A pair of right and left guide rails 255 constituting the rear portion guide mechanism 252 have a length shorter than the total length of the guide rail 253, and respectively fixed to the inside opposing surface to be urged to the downward portion of the rectangular window 224 in the rear portion of the vertical beam member 221. A single bearing block 256 allowed to freely run on each of the guide rails 255 is secured to the lower end portion on the side surface of the saddle 250 opposing to the guide rail. Accordingly the saddle 250 is structured such that the front portion is guided by four bearing blocks 254 secured to four corners thereof and the rear portion is guided by two bearing blocks 256 secured to two corners of the lower portion.

As one of the features of the embodiment in accordance with the present invention, shown in a schematic view of FIG. 6 as seen from a direction of a right side elevational view of FIG. 14, a line connecting two upper and lower bearing blocks 254 in the front portion and a bearing block 256 in the rear portion forms a right triangle. A high rigidity, thus, can be obtained against the cutting force acting on the tool spindle 271. Further, similarly as seen from a direction of the right side elevational view of FIG. 14, a line connecting front and rear bearing blocks 230 and 231 for guiding the lower portion of the gantry 220 and a bearing block 233 for guiding the upper portion forms an isosceles triangle. In this arrangement, a high rigidity can also be obtained against the cutting force.

As shown by a broken line in FIG. 14, feeding means for feeding the saddle 250 in the vertical (Y-axis) direction is constituted by the electrical linear motors 257 respectively arranged between both side surfaces of the saddle 250 and the inside surface of the vertical beam member 221. Each of the linear motors 257 is constituted by the magnetic plate unit 257a disposed on the inside surface corresponding to the vertical beam member 221 along the vertical direction between the front and rear guide rails 253 and 255 on each of the side surfaces of the saddle 250, and the coil unit 257b secured to the side surface of the saddle 250. The coil unit 257b is so arranged to oppose to the magnetic plate unit 257a.

The saddle 250 is formed in a box shape and a long cylindrical shape in the longitudinal direction, and a rear portion thereof is faced within the rectangular window 218 of the fixing frame 215. The ram 260 is guided within the central window 250a of the saddle 250 so as to freely move in the back-and-forth (Z-axis) direction. The ram 260 is formed in a hexagonal shape inclined toward the narrow upper surface from both side surfaces, as seen from the front surface of FIG. 15, and is formed in an elongated shape in the back-and-forth (Z-axis) direction so as to extend through the saddle 250 and the rectangular window 224 and 218 and have the rear end projecting from the rear portion of the fixing frame 215.

The guide means for guiding the ram 260 in the back-and-forth direction is constituted by a pair of lower portion linear guide mechanisms 261 disposed between both sides of the lower surface having a wide width and the saddle 250, and a single upper portion linear guide mechanism 262 disposed between the upper surface having a narrow width and the saddle 250. Like the linear guide mechanism as described above, each of the guide mechanisms 261, 262 is constituted by straight guide rails 263, 264 and one or two bearing blocks 265, 266 running on the rail.

The back-and-forth (Z-axis) direction guide means of the ram 260 is featured to have guide rails 263, 264 secured to the ram 260 and also have the bearing blocks 265, 266 secured to the saddle 250. More specifically as shown in FIG. 19, in each of the lower portion linear guide mechanism 261, two bearing blocks 265 are secured to the front portion and the middle portion in the longitudinal direction of the ram 260, and in the upper portion linear guide mechanism 262, one bearing block 266 is secured to the front portion of the ram 260.

Figure 19:
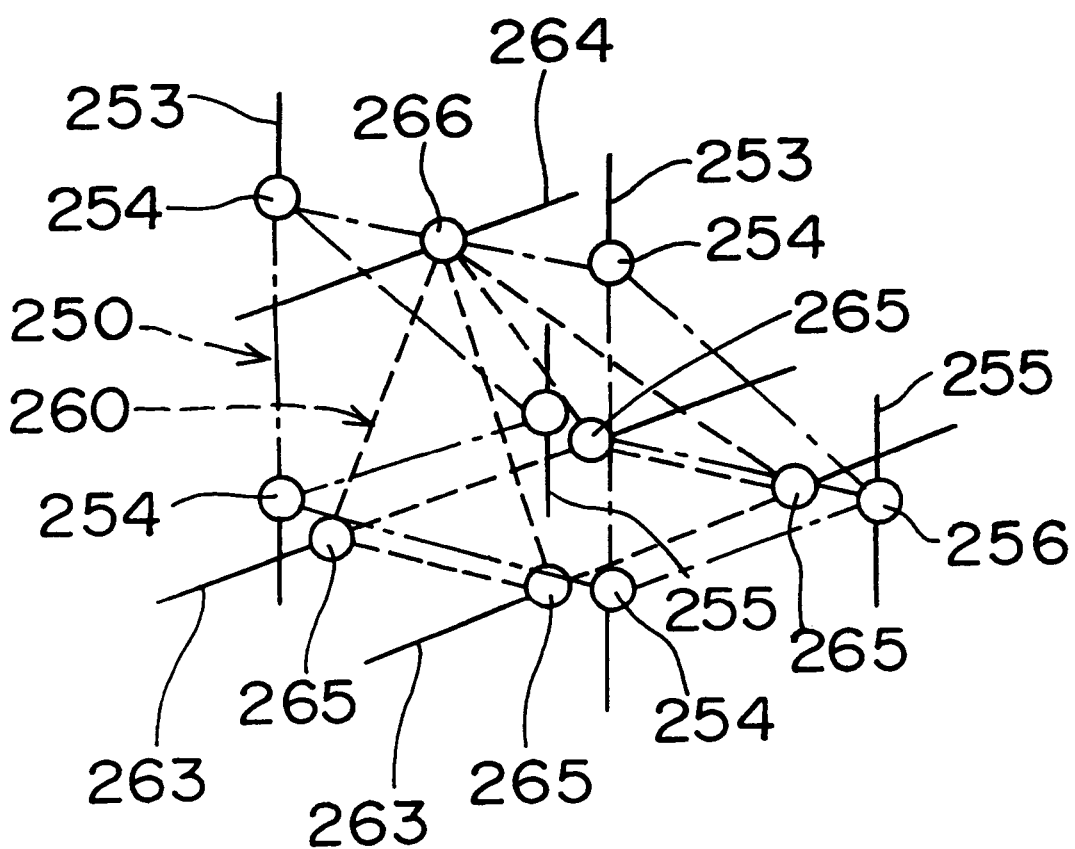
FIG. 19 is an explanatory view showing a relationship between an arrangement of a bearing block for guiding a ram in a Z-axis direction and an arrangement of a bearing block for guiding a saddle in a Y-axis direction according to the second embodiment.

As one of the other additional features of the embodiment in accordance with the present invention, as shown in a schematic view in FIG. 19, as seen from the direction of the right side elevational view of FIG. 14, the upper portion and the lower portion bearing blocks 265 and 266 are arranged such that a line connecting them forms a right triangle and a high rigidity can be obtained against the working force acting on the tool spindle 271.

As drive means for feeding the ram 260 to the back-and-forth (Z-axis) direction, an electric linear motor 267 disposed between the lower surface of the ram 260 and the saddle 250 is used. The linear motor 267 is constituted by an electromagnetic coil unit 267b mounted to the saddle 250 between the guide rails 263, 263, and a magnetic plate unit 267a having a plurality of magnetic plates mounted on the lower surface of the ram 260 in series in the Z-axis direction so as to face the coil unit 267b.

The ram 260 receives a cylindrical bearing case (not shown), and the case rotatably supports the tool spindle 271 through a bearing apparatus (not shown) around an axis extending along the Z-axis. The case 270 also installs a built-in motor (not shown) rotating the tool spindle 271. The bearing apparatus is of a type using one of a ball bearing, a roller bearing and a fluid bearing using an air and a liquid as a bearing medium or a combination thereof.

The tool spindle 271 installs a mechanism for attaching a tool T to the front end therein, thereby replacing various kinds of tools such as a drill, an end mill, a milling cutter, a tap, a reamer, a grinding stone, a cutting tool and the like as occasion demands in the front end of the tool spindle 271 manually or automatically by means of an ATC so as to give the work W various kinds of processes.

An operation of the above-structured second embodiment will be described.

The work W is attached on the work table 211 by means of an appropriate jig. An NC apparatus (not shown) rotates the tool spindle 271 in accordance with the input NC program, moves the gantry 220, the saddle 250 and the ram 260 respectively along the X-axis, the Y-axis and the Z-axis, and brings the cutting tool T attached to the front end of the tool spindle 271 into contact with the work W subjected to cutting process.

Assuming that the tool T is a drill, the NC apparatus synchronously drives the linear motors 235, 237, moves the gantry 220 in the both upper and lower end portions thereof at a fast feeding speed along the X-axis, and positions the drill T at coordinates of the X-axis (a position in the lateral direction) of the hole of the work W to be processed. In this case, depending on a size of the work W, the gantry 220 proceeds to the position where the right and left vertical beam members 221 laps over the column member 216 of the fixing frame 215 in the corresponding end.

In parallel with the positioning operation or subsequent thereto, the NC apparatus synchronously drives the linear motors 257, 257, moves the saddle 250 along the Y-axis (vertical direction) at a fast feeding speed in both right and left end portions of the saddle 250, and positions the drill T at coordinates of Y-axis of the hole of the work W to be processed. Accordingly, the drill T is brought to the position coaxial with the hole to be processed.

After setting the drill T to be coaxial with the position of the hole to be processed, the NC apparatus drives the linear motor 267, fast feeds the ram 260 toward the work W, and switches the forward feeding speed to the cutting feeding speed when the front end of the drill T reaches a position at a predetermined interval from the surface of the work W, thereby performing a predetermined drill process to the work W. A starting process and a finishing process of the fast feeding of the gantry 220, the saddle 250 and the ram 260 are performed at an acceleration or a deceleration, for example, of 1 G or higher.

When a hole formation is completed, the ram 260 is retracted to a position at which a predetermined clearance is secured between the front end of the drill T and the surface of the work W. Next the gantry 220 and the saddle 250 are moved at a fast feeding speed so that the drill T is aligned with the position of the hole to be next processed, and the ram 260 is fed again for cutting so that the next hole is formed. As mentioned above, a plurality of holes are successively formed on the surface of the work W at a high speed.

Assuming that the tool T is subjected to milling, for example, a milling cutter or an end mill, the gantry 220 and the saddle 250 are controlled for fast feeding in the same manner as the case of the above-described drill process, and the cutter or the end mill T is positioned at the X and Y coordinates of the position where the process of the work W starts. Thereafter, the ram 260 is fed for cutting so as to insert the cuter or the end mill T on the surface of the work W to a predetermined depth, thereafter selectively or simultaneously moves the gantry 220 or the saddle 250 respectively along the X-axis and the Y-axis at a feeding speed for cutting, and performs a milling on the surface of the work W.

In this case, a great cutting force will act on the tool spindle 271. In the machine tool in accordance with the present invention, the lower portion linear guide mechanism 227 for guiding the gantry 220 is arranged to be directed to have a great rigidity against the force of the gantry 220 which sinks downward. Meanwhile the upper portion linear guide mechanism 228 is arranged to be directed to a direction 90 degrees different from that of the lower portion linear guide mechanism 227 so as to have a great rigidity against the force of the gantry 220 which moves backward. Further, the lower portion linear motor 235 and the upper portion linear motor 237 for driving the lower end and the upper end passing through a center of gravity of the gantry 220 attract the gantry 220 downward to the base 210 and backward to the fixing frame 215, respectively. Accordingly, they strongly react against the force acting along the direction of lifting up the gantry 220 during the process of the work W and also strongly react against the intermittent change in the force acting along the Z-axis. As a result, the gantry 220 is prevented from displacing in the vertical or the back-and-forth direction with respect to the base 210 and the fixing frame 215 by an amount equal to a gap or a play existing between each of the rails and the bearing block in the lower portion linear guide mechanism 227 and the upper portion linear guide mechanism 228. As a result, an adverse influence to the working accuracy can be avoided.

Next, a separating operation and a reassembling operation of four members constituting the gantry 220, that is, the right and left vertical beam members 221 and the upper and lower horizontal beam members 222, 223 will be described. This kind of operation is mainly required for inspecting or replacing the lower portion linear motor 235 of the gantry 220, and further inspecting or replacing the components on the saddle 250 guided by the gantry 220.

A separating operation of the gantry 220 is performed first by removing a bolt (not shown) attaching both ends of the cross beam 217 of the fixing frame 215 to the upper end surface of the right and left column members 216, and next by removing a bolt (a reference numeral is omitted) attaching both ends of the upper and horizontal beam member 222 of the gantry 220 to the upper end surface of the right and left vertical beam members 216. The upper and horizontal beam member 222 and the cross beam 217 are lifted up by a hoist crane (not shown) so as to be separated from the machine tool while guiding the upper and horizontal beam member 222 to the cross beam 217.

Next, the saddle 250 is suspended and lifted up by a hoist crane (not shown), thereby disengaging the bearing blocks 254, 256 of the saddle 250 from the guide rails 253, 255 on the right and left vertical beam members 221. Accordingly, the saddle 250, the ram 260 and the tool spindle 271 supported thereto are collectively separated from the machine tool, and moved on a working table (not shown), so that inspection, disassembling and reassembling thereof can be easily performed.

Next, the bolt inserted into the pockets 221b, 221c shown in FIG. 17 and securing each of the vertical beam members 221 to the lower and horizontal beam members 223 is loosened and removed, thereby separating each of the vertical beam members 221 from the lower and horizontal beam member 223. Accordingly, the lower end portions of the right and left vertical beam member 221 are disconnected. In this state, each of the vertical beam members 221 has been kept movably guided on the front end guide rail 229 by the bearing block 230 secured to the lower surface thereof.

Therefore, each of the right and left vertical beam members 221 can be optionally moved in a mutually independent manner, so that the operator is allowed to enter into the expanded space between the right and left vertical beam members 221, and easily inspect, maintain and replace the magnetic plate unit 257a of the linear motor 257 for vertically driving, and the front and rear guide rails 253 and 255 mounted on the inside surface of each of the vertical beam members 221. Since the inspection, maintenance and replacing operation can be performed without separating each of the vertical beam members 221 from the bearing block 230 on the lower surface thereof, the guide direction of the bearing blocks 230 along the X-axis and the guide direction of the guide rails 251, 252 for vertically guiding the saddle 250 along the Y-axis securely form a right angle, so that there is advantages that the subsequent reassembling can be easily performed, and the guiding accuracy before separation can be securely reproduced.

Further, the inspection and replacing operation of the lower portion linear motor 235 of the gantry 220, particularly the electromagnetic coil unit 235b can be performed after separating the vertical beam member 221 from the lower and horizontal beam member 223 in the following manner. The bolt mounting the coil unit 235b to the lower and horizontal beam member 223 is loosened and removed from the receiving surface 223b in both ends of the lower and horizontal beam member 223 so as to separate the coil unit 235b from the lower and horizontal beam member 223. Accordingly, the inspection and replacing operation of the coil unit 235b can be easily performed.

In this state, since the lower and horizontal beam member 223 has been kept secured to the bearing block 231 guided by the guide rail 229 in the rear portion, the seat surface 223b disposed in both end portions of the lower beam member 223 and the lower end surface of each of the vertical beam members 221 are securely arranged in parallel with each other. The vertical receiving surface 223c of the lower beam member 223 and the lower portion inside surface of each of the vertical beam members 221 are likewise securely arranged in parallel with each other. The reassembling operation of each of the vertical beam members 221 in the lower and horizontal beam member 223 subsequent to the inspection and replacement of the coil unit 238 can be easily performed, and a guiding accuracy as a combination of assembling both vertical beam members 221 in the lower and horizontal beam member 223 can be easily and accurately reproduced.

As mentioned above, after finishing the inspection and the maintenance and the replacement as occasion demands, the assembly including the saddle 250, the ram 260 and the tool spindle 271 supported thereto is suspended to the hoist crane, and the bearing blocks 254, 256 in both side surfaces of the saddle 250 are fitted to the guide rails 253, 255 for vertically guiding from the upper end side of the vertical beam member 221, thereby being easily reassembled on the right and left vertical beam members 221. In this reassembling, since the arranging relation including a parallelism between the bearing blocks 254, 256 and the guide rails 253, 255 is kept unchanged until the bearing blocks 254, 256 are separated from the saddle 250, not only the reassembling can be easily performed, but also the guiding accuracy after reassembling can be easily and accurately reproduced.

After reassembling the saddle 254 to the right and left vertical beam members 221, the cross beam 217 of the fixing frame 215 and the upper beam member 222 of the gantry 220 are suspended by the hoist crane in a state where both are assembled, and respectively assembled on the right and left column members 216 and the right and left vertical beam members 221 again. In this assembling operation, since the interval between the both can be easily reproduced in the state before the separation as mentioned above in reassembling the right and left vertical beam members 221, and since the assembling relation among the vertical beam member 221, the bearing block 230 in the lower end and the front portion guide rail 229 is kept unchanged, the assembling state between the upper and horizontal beam member 222 and the right and left vertical beam member 221 can be easily reproduced simultaneously with reproducing the assembling state between the cross beam 217 and the right and left column members 216. Furthermore the guiding accuracy on the base 210 of the gantry 220 and the fixing frame 215 can be restored to an original condition in a state of reproducing the assembly before the separation.

In this case, although the explanation is omitted, the assembly between the right and left vertical beam members 221 and the lower and horizontal beam member 223 is performed by pressing the taper pin between the both in a well-known manner in addition to securing by means of the bolt, so that the taper pin is pulled out by loosening and taking out the bolt at a time of separating. Meanwhile, at a time of reassembling, the bolt is screwed after pressing the taper pin between the both at first, thereby securely reproducing the relative position in the securing state between the both. The taper pin of this kind is similarly used for an assembly between both ends of the cross beam 217 and the column member 216, and an assembly between both ends of the upper and horizontal beam member 222 and the right and left vertical beam members 221.

As one additional feature of the embodiment in accordance with the present invention, in a state of separating the right and left vertical beam members 221 and the upper and lower horizontal beam members 222, 223 constituting the gantry 220 into four members, at least right and left vertical beam members 221, preferably each of the four members is kept in a state of being guided through the bearing block with respect to a guide rail, so that the reassembling of the gantry 220 can be easily performed as mentioned above, and the guiding accuracy after reassembling can be securely reproduced to be high accuracy before separation.

Further, in the case of shortening the saddle 250 in such a manner that the rear end of the saddle 250 does not face within the rectangular window 218 of the fixing frame 215, another separating method can be employed. In this method, the assembly of the ram 260 supporting the tool spindle 271 can be pulled out from the front surface or the back surface of the saddle 250 by removing a stop mechanism (not shown) for mechanically restricting the front and rear stroke ends of the ram 260. Thereafter, the stop mechanism (not shown) for mechanically restricting the right and left stroke end of the gantry 220 is taken out, and the gantry 220 is integrally assembled by the four components thereof, that is, the right and left vertical beam members 221 and the upper and lower horizontal beam members 222 and 223, and can be taken out to the rightward direction or the leftward direction of the fixing frame 215 in a state of guiding the saddle 250.

The gantry 220 is again reassembled in such a manner as to be guided to the base 210 and the fixing frame 215 after being removed therefrom in this manner and performing the inspection, maintenance and replacing operation of the necessary portion.

The separating method can be easily achieved on the basis of a multiplier combination between one characteristic structure of the present invention, that is, the gantry 220 is guided in front of the fixing frame 215, and a point that the X-axis direction drive mechanism of the gantry 220 and preferably the Z-axis direction drive mechanism of the ram 260 are constituted by the linear motor.

(Third Embodiment)

Figure 20:
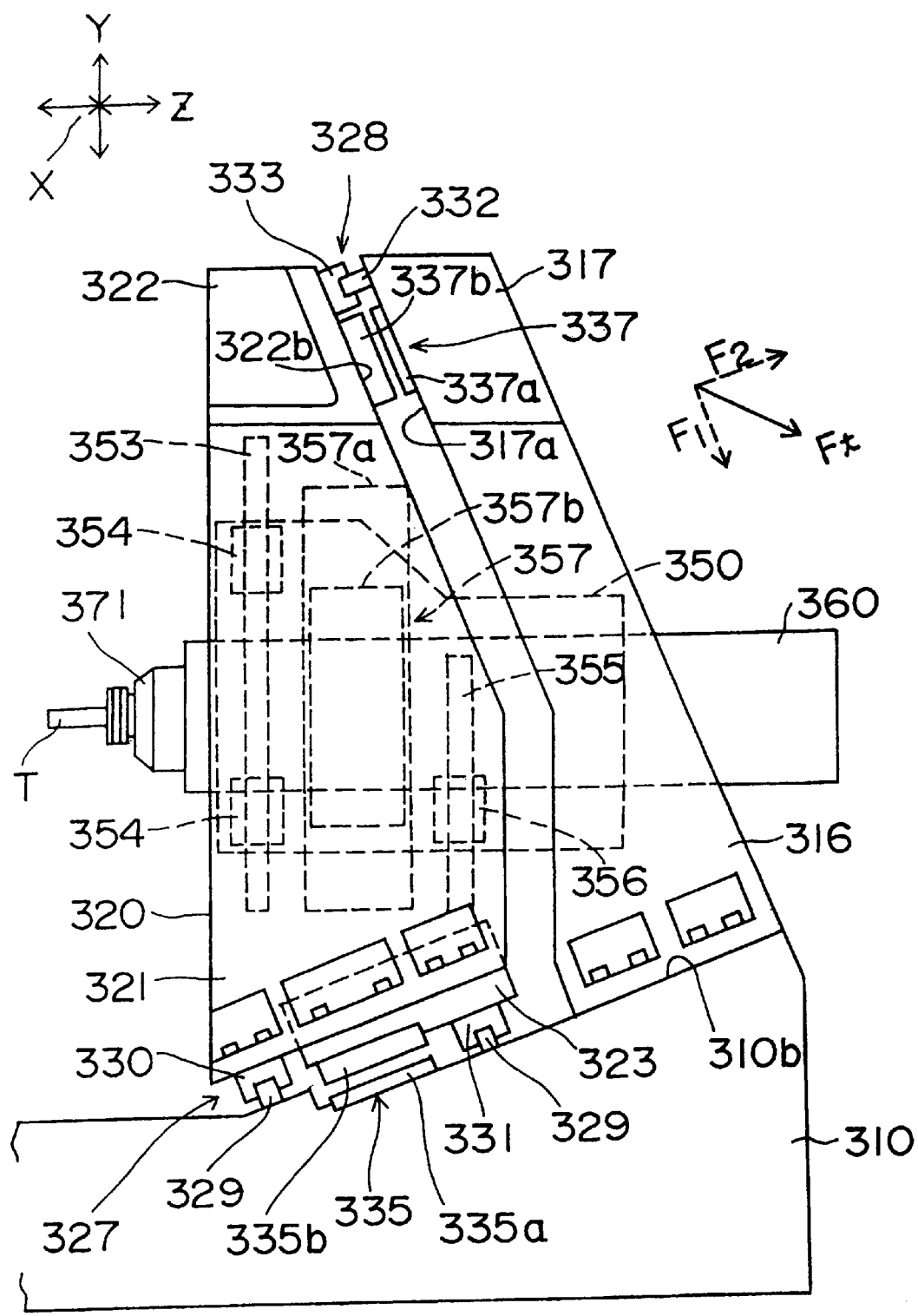
FIG. 20 is a right side view showing a machine tool driven by a linear motor according to a third embodiment of the present invention.

Next, a third embodiment in accordance with the present invention will be described with reference to FIG. 20. Reference numerals of elements in this embodiment are shown by adding a hundred to the reference numerals of the corresponding elements in the second embodiment.

In this embodiment, the upper surface of the rear portion in the base 310 is formed as a slant surface 310b upwardly inclined toward the rear portion, and right and left column members 316 of a fixing frame 315 are stood from the rear end portion of the slant surface 310b in a perpendicular manner to the slant surface 310b.

The column member 316 is formed in a shape frontward inclining toward the upper end, and secures the lower surface of both ends of the cross beam 317 in such a manner as to freely separate in the upper end surface thereof. A front surface 317a of the cross beam 317 is forward inclined toward the upper portion in such a manner to align with the front surface of the column member 316 in both ends.

The gantry 320 is structured such that a bottom surface of a lower and horizontal beam member 323 corresponding to a bottom surface is substantially in parallel with the slant surface 310b, and a back surface 322b of an upper and horizontal beam member 322 corresponding to a rear surface of an upper portion and a back surface of an upper portion of the right and left vertical beam members 321 are in parallel with the front surface 317a of the upper and horizontal beam member 317 and the front surface of the upper portion of the column member 316. Accordingly, the gantry 320 is formed in a box shape in the same manner as that of the first embodiment as seen from the front surface of the machine tool. However it is formed in a shape similar to a right triangle having an oblique line perpendicular to a vertical direction as seen from a direction of a rightward side elevational view of FIG. 20.

Lower portion guide means 327 for guiding the lower portion of the gantry 320 along the X-axis is constituted by a front portion linear guide mechanism and a rear portion linear guide mechanism, and a bearing block 330 of the front portion guide mechanism is directly mounted to the lower surface of the front portion of the right and left vertical beam members 321, however, the bearing block 331 of the rear portion guide mechanism is mounted on the lower surface of the lower and horizontal beam member 323. A lower portion linear motor 335 is disposed along the front portion and the rear portion guide rails 329 and therebetween, and an electromagnetic coil unit 335b is mounted on a lower surface of the lower and horizontal beam member 323 in such a manner to be freely separated.

A single upper portion linear guide mechanism 328 for guiding the upper portion of the gantry 320 along the X-axis is secured to the front surface 317a of the cross beam 317 in a state where the guide rail 332 thereof horizontally extends along the upper end edge of the front surface 317a of the cross beam 317.

An upper portion linear motor 337 for driving the upper portion of the gantry 320 along the X-axis mounts a magnetic plate unit 337a on the front surface 317a of the cross beam 317 in the lower portion close to the upper portion linear guide mechanism 328, and mounts the electromagnetic coil unit 337b on the back surface 322b of the upper and horizontal beam member 322.

Here, the front and rear linear guide mechanisms in the lower portion are disposed so as to oppose the maximum load F1 having a direction of directing perpendicular to the slant surface 310b. Meanwhile the linear guide mechanism 328 in the upper portion is disposed so as to oppose to the maximum load F2 having a direction parallel to the slant surface 310b, thereby being directed to a direction 90 degrees different from the lower portion linear guide mechanism. Similarly the lower portion linear motor 335 attracts the gantry 320 in the direction of operating the maximum load F1 of the lower portion linear guide mechanism 327, and the upper linear motor 337 attracts the gantry 320 in the direction of operating the maximum load F2 of the upper portion linear guide mechanism 328.

The attracting direction of each of the lower portion and the upper portion linear motors 335, 337 is set to be the same as the operating direction of the maximum loads F1, F2 of the corresponding linear guide mechanisms 327, 328, so that it is structured such that no distorted abrasion is generated on the guide surfaces in both sides of each of the guide rails 329, 332 in the linear guide mechanisms 327, 328.

Further, it is structured such that a combined force Ft of the maximum loads F1 and F2 operates in the direction of slightly descending as it goes rearward. Accordingly, even when the cutting force acting on the tool spindle 371 causes a continuous or intermittent force which is likely to lift us the gantry, the gantry 320 can be strongly held against the force intending to lift up, and a play existing in each guide portion of the linear guide mechanisms 327, 328 prevents the gantry 32 from moving in back-and-forth and vertical directions.

Still further, the upper portion linear motor 337 is positioned immediately above the lower portion linear motor 335, and the both linear motors 337 and 335 are disposed within the vertical surface formed by the X-axis direction and the gravity operating direction along the X-axis. Preferably, the vertical surface is selected such that the center of gravity of the gantry 320, preferably the center of gravity of the gantry 320 and the assembly vertically moving therewith exists within the surface. A zigzag motion of the gantry 320 in the movement along the X-axis can be certainly prevented by disposing the upper and lower linear motors 337, 335 within the vertical surface including the center of gravity of the gantry 320.

The right and left linear motors 357 for vertically moving the saddle 350 within the vertically rectangular window of the gantry 320 is disposed such that a center in the Z-axis direction perpendicular to the drive direction thereof exists within the vertical surface as described above including the center of gravity of the upper and lower linear motors 337, 335 and the gantry 320.

The other mechanism for guiding and driving the saddle 350 in the vertical direction, the mechanism for guiding and driving the ram 360 in the back-and-forth direction within the rectangular window of the saddle 350, and the mechanism for supporting the tool spindle 371 to the ram 360 rotatably are the same as those of the second embodiment as described above. Therefore the detailed description will be omitted.

Further, since the operation of this embodiment is almost the same as that of the second embodiment as described above, the description thereof will be omitted. However there exists a difference with respect to the operation between the second embodiment and the third embodiment in a point that the lower portion linear guide mechanism 327 in accordance with the third embodiment more positively opposes to the working force in the Z-axis direction than the lower portion linear guide mechanism 227 in accordance with the second embodiment.

In each of the embodiments as described above, it is structured such that the rectangular windows 218, 318 are formed in the fixing frames 215, 315, and the saddles 250, 350 and the rear end portions of the rams 260, 360 can move within the rectangular window, however, in the machine tool having a short moving stroke along the Z-axis, the rectangular windows 218, 318 are not required, and the saddles 250, 350 and the rear end portions of the rams 260, 360 may be movable in the front portion of the fixing frames 215, 315.

Further, in each of the embodiments as described above, the lower and horizontal beam members 223, 323 of the gantries 220, 320 are attached to the flat lower surface of the vertical beam members 221, 321. However, the structure may be made such that a difference in level is provided in the rear portion of the lower surface of the vertical beam members 221, 321 at a degree of a thickness of the portion of the receiving surface 223a in both ends of the lower and horizontal beam members 223, 323 so as to dispose the guide rails 229, 329 of the front and rear linear guide mechanisms 227, 327 disposed in the lower portion of the vertical beam members 221, 321 on a single plane on the base 210, 310.

Still further, the guide mechanisms 227, 327 for guiding the lower surface of the gantry 220, 320 is provided as a pair along the Z-axis, however, this guide mechanism is not always constituted by a pair, and only the front end linear guide mechanisms 229, 230 (329 and 330) may be provided.

Each of the linear guide mechanisms described above is structured such that each of the bearing blocks holds a rolling body such as a multiplicity of balls, rollers or the like as a medium for reducing a friction in such a manner as to circulate, and is of the type which can run on the guide rail through the rolling body only in the longitudinal direction, however, the other type such as the guide mechanism of the type which uses a pressure fluid as a medium for reducing a friction can be used.

What is claimed is:

1. A machine tool comprising:
    a base;
    a fixing frame vertically extending on the base and having a first opening portion;
    a gantry having a second opening portion, disposed in the front surface of said fixing frame in a state where a part thereof is received in said first opening portion of said fixing frame and capable of moving in a first horizontal direction on said base;
    a saddle vertically guided within said second opening portion of the gantry;
    a ram movably guided in a second horizontal direction perpendicular to said first horizontal direction by said saddle;
    a tool spindle rotatably supported with respect to an axis extending along said second horizontal direction by said ram and capable of mounting a tool in a front end portion;
    guide means including lower portion guide means disposed between the lower surface of said gantry and the base and upper portion guide means disposed between an upper front surface of said fixing frame and an upper back surface of said gantry, and guiding said gantry in said first horizontal direction; and
    drive means including a lower portion linear motor for driving the lower surface of said gantry and an upper portion linear motor for driving the upper back surface of said gantry, and driving said gantry in said first horizontal direction.

2. A machine tool as claimed in claim 1, wherein said upper portion and lower portion guide means respectively include upper portion and lower portion rail means; and
    both ends in said first horizontal direction of the upper portion and lower portion rail means extends to both end portion of said fixing frame over said first opening portion of said fixing frame.

3. A machine tool comprising:
    a base;
    a workpiece provided on said base;
    a first moving member provided on said base and slidable along a first axis relative to said workpiece through a first slide device;
    a second moving member provided on said first moving member and slidable along a second axis perpendicular to said first axis relative to said workpiece through a second slide device;
    a third moving member provided on said second moving member and slidable along a third axis mutually perpendicular to said first and second axes relative to said workpiece through a third slide device;
    a tool spindle provided on said third moving member and rotating around said third axis; and
    at least three supporting fulcrum provided on at least one of said three slide devices for supporting at least one of said three moving members corresponding to said at least one of three slide members, said at least three fulcrum are configured to be arranged on a plane defined by said first and second axes,
    wherein said guide apparatus is constituted by a guide apparatus for an X-axis, a guide apparatus for a Y-axis and a guide apparatus for a Z-axis;
    said slide member is constituted by a gantry movable along an X-axis through said X-axis guide apparatus, a saddle movable along a Y-axis through said Y-axis guide apparatus and a ram movable along a Z-axis through said Z-axis guide apparatus; and
    three supporting points at which said X-axis guide apparatus, said Y-axis guide apparatus and said Z-axis guide apparatus respectively support the gantry, the saddle and the ram are disposed to form vertexes of a triangle as seen from the X-axis direction.

4. A machine tool as claimed in claim 3, wherein two supporting points of said three supporting points of said X-axis guide apparatus and two supporting points of said three supporting points of said Y-axis guide apparatus are disposed on the same plane perpendicular to the Z-axis.

5. A machine tool as claimed in claim 3, wherein said three supporting points of said Z-axis guide apparatus are disposed to form vertexes of an isosceles triangle having a horizontal bottom line as seen from the Z-axis direction.

6. A machine tool comprising:
    a tool spindle rotating around an axis;
    a slide member movable in said axial direction of said tool spindle;

a drive apparatus for moving said slide member; and a guide apparatus having a straight rail, movably supporting said slide member on the guide rail, and disposed such that supporting points for supporting said slide member form vertexes of a triangle as seen from a direction perpendicular to said axial direction of said tool spindle.

7. A machine tool as claimed in claim 6, wherein said drive apparatus is a linear motor.

8. A machine tool as claimed in claim 6, wherein each of said supporting points is a bearing block movably supported on said straight rail.

9. A machine tool as claimed in claim 8, wherein said bearing block is set to form vertexes of a right triangle when said slide member is at a forward moving end.

10. A machine tool as claimed in claim 8, wherein said straight rail is fixed to said slide member, and said bearing block is fixed to a fixing end for supporting said slide member.

11. A machine tool as claimed in claim 1, wherein said gantry is constituted by a pair of right and left vertical beam members apart from each other in said first horizontal direction, a lower and horizontal beam member connected to an opposing surface inside the vertical beam member so as to capable of separating and extending along said first horizontal direction, and an upper and horizontal beam member connected to an upper end surface of said vertical beam member so as to capable of separating and extending along said first horizontal direction, and said lower portion guide means is constituted by a rail fixed to said base and at least two bearing blocks allowed to run on the rail and mounted on the lower surface of each of a pair of said vertical beam members.

12. A machine tool as claimed in claim 11, wherein said upper portion guide means is constituted by a rail fixed to the upper front surface of said fixing frame, and a bearing block allowed to run on the rail and mounted on the back surface of said upper beam member.

13. A machine tool as claimed in claim 1, wherein a center point on which respective attractive forces of said upper portion linear motor and said lower portion linear motor act is positioned within the same vertical surface including a center of gravity of the gantry.

14. A machine tool as claimed in claim 1, wherein a center point on which respective attractive forces of said upper portion linear motor and said lower portion linear motor act is positioned within the same vertical surface including a center of gravity of the gantry and a center of gravity of an assembly vertically moving together with said gantry.

15. A machine tool as claimed in claim 1, wherein said upper portion and lower portion linear motors are disposed in a different direction such that an attracting force of said lower portion linear motor acts in said vertical direction and an attracting force of said upper portion linear motor acts in said second horizontal direction.

16. A machine tool as claimed in claim 2, wherein said fixing frame includes a pair of column members secured to both end portions in said first horizontal direction of said base, and a cross beam having both end portions secured to an upper surface of said column members and projecting to a portion near the center position of said gantry in said second horizontal direction, and said upper portion rail means is mounted on the front end surface of said cross beam and disposed in a substantially middle portion of a width of said gantry in said second horizontal direction.

17. A machine tool as claimed in claim 2, wherein said lower portion linear motor is disposed between the lower surface of said gantry and the upper surface of said base immediately below said upper portion rail means, said lower portion rail means is fixed on said base and includes a pair of guide rails longitudinally apart from each other in the second horizontal direction, and said lower portion linear motor is positioned between a pair of guide rails.

18. A machine tool as claimed in claim 1, wherein said base has a slant surface inclined with respect to said second horizontal direction;

said fixing frame is constituted by a pair of column members fixed to said slant surface and a cross beam connecting the upper ends of said column members, and said gantry has the lower surface and the upper rear surface formed in a shape respectively substantially parallel with said slant surface and said column member, respectively.

* * * * *